United States Patent [19]

Bishop et al.

[11] Patent Number: 5,062,040
[45] Date of Patent: Oct. 29, 1991

[54] HANDLING OF NOTIFICATION OF ASYNCHRONOUS EVENTS BY USER AND STUB PROCESSES OF A DISTRIBUTED PROCESS EXECUTING ON A PLURALITY OF PROCESSORS OF A MULTI-PROCESSOR SYSTEM

[75] Inventors: Thomas P. Bishop, Aurora; Robert W. Fish, West Chicago; James S. Peterson, Aurora, all of Ill.

[73] Assignee: AT&T Bell Laboratories, Murray Hill, N.J.

[21] Appl. No.: 415,439

[22] Filed: Sep. 28, 1989

Related U.S. Application Data

[63] Continuation of Ser. No. 941,704, Dec. 22, 1986, abandoned.

[51] Int. Cl.[5] .............................................. G06F 15/16
[52] U.S. Cl. ................................. 364/200; 364/230; 364/280.9; 364/281.3; 364/286.0
[58] Field of Search ... 364/200 MS File, 900 MS File

[56] References Cited

U.S. PATENT DOCUMENTS

| | | | |
|---|---|---|---|
| 3,641,505 | 2/1972 | Artz et al. | 364/200 |
| 4,223,380 | 9/1980 | Antonaccio et al. | 364/200 |
| 4,393,470 | 7/1983 | Miard | 364/200 |
| 4,475,156 | 10/1984 | Federico et al. | 364/200 |
| 4,494,189 | 1/1985 | Bean et al. | 364/200 |
| 4,530,051 | 7/1985 | Johnson et al. | 364/200 |
| 4,533,996 | 8/1985 | Hartung et al. | 364/200 |
| 4,539,637 | 11/1985 | DeBruler | 364/200 |
| 4,564,903 | 1/1986 | Guyette et al. | 364/200 |
| 4,591,975 | 5/1986 | Wade et al. | 364/200 |
| 4,608,631 | 8/1986 | Stiffler et al. | 364/200 |
| 4,660,144 | 4/1987 | Walsh | 364/200 |
| 4,731,736 | 3/1988 | Mothersole et al. | 364/900 |
| 4,914,570 | 4/1990 | Peacock | 364/200 |
| 4,945,470 | 7/1990 | Takahashi | 364/200 |

FOREIGN PATENT DOCUMENTS 0049521 4/1982 European Pat. Off. .
0139568 5/1985 European Pat. Off. .

OTHER PUBLICATIONS

R. Thompson "UNIX Implementation", Bell System Technical Journal, Jul.-Aug. 1978, vol. 57, No. 6, pp. 1931–1946.
P. Jackson "UNIX Variant Opens a Path for Managing Multiprocessor Systems", Electronics, Jul. 28, 1983, pp. 118–124.
H. Lycklama et al., "UNIX Time-Sharing System: A Minicomputer Satellite Processor System", The Bell System Technical Journal, vol. 57, No. 6 (Jul.-Aug. 1978) pp. 2103–2113.
M. J. Bach, *The Design of the UNIX ®Operating System*, Prenctice-Hall, Inc., *1986, pp. 200–211, 412–422*.
A. Barak et al., "A Distributed Load-Balancing Policy for a Multicomputer", *Software Practice and Experience*, vol. 15, No. 9 (Sep. 1985) pp. 901–913, J. Wiley & Sons, Ltd., Chichester, Sussex, G.B.

*Primary Examiner*—Thomas C. Lee
*Assistant Examiner*—William M. Treat
*Attorney, Agent, or Firm*—David Volejnicek

[57] ABSTRACT

There is a disclosed a multi-processing arrangement in which processes running on one processor may utilize processes, called stub processes, running on other processors. One problem that occurs with respect to such a system is that signals, which indicate the occurrence of external asynchronous events, must be processed in a specified order if the system is to work properly. Disclosed is a system for insuring the proper processing of such signals by requiring all such signals to be routed from a receiving process on a adjunct processor to the main user process on the originating processor. Also disclosed is an arrangement for insuring that signals are not lost and that duplicate signals are not processed.

38 Claims, 13 Drawing Sheets

GENERALIZED SIGNAL ROUTING

POSTING SIGNALS

THE SIGNAL HANDLER

HANDLING OF REMOTELY GENERATED SIGNALS

GROUP SIGNAL HANDLING

HANDLING OF NOTIFICATION OF ASYNCHRONOUS EVENTS BY USER AND STUB PROCESSES OF A DISTRIBUTED PROCESS EXECUTING ON A PLURALITY OF PROCESSORS OF A MULTI-PROCESSOR SYSTEM

CROSS-REFERENCE TO RELATED APPLICATIONS

This application is a continuation of application Ser. No. 06/941,704, filed on Dec. 22, 1986, now abandoned.

Bishop, Fish, Peterson, and Tuvell, "Virtual Execution of Programs on a Multi-Processor System" Ser. No. 941,700, filed Dec. 22, 1986, now U.S. Pat. No. 4,849,877, issued on July 18, 1989.

BACKGROUND OF THE INVENTION

1. Field of the Invention

This invention relates to multi-processor systems and, more particularly, to signal processing in such systems where a process, running on one processor, may have extension or auxiliary processes running on one or more other processors.

2. Description of Related Art

In traditional computer systems, a single processor is used to control the flow of information and to process that information. When increased capacity, sometimes called throughput, is required, several alternatives have been used. One such alternative is to use a co-processor to help with certain of the tasks. This co-processor, while effective for some situations, cannot be used for unlimited expansion of capacity.

Another approach, and the one traditionally used, is to upgrade the computer system to a larger one having a faster processor. The original computer system can be eliminated or assigned to some other task. Of course, in any such upgrade, it is imperative that the programs (processes) written for use on the original system continue to be usable on the upgraded system. Thus, the "new" upgraded system must be transparent to the existing programs.

In the concurrently filed, co-pending patent application referred to above, there is disclosed a multi-processor system where independent processors are used to simultaneously execute the programs running on the system. Such a system is a forward step and should allow for vastly improved throughput and processing capabilities. However, as with most advances in the computer art, several problems become significant. For multi-processing, these problems must first be identified and then solved in order to take advantage of the increased capability multi-processing offers. Before progressing further, a brief discussion of signals and interrupts will be undertaken to provide a common foundation for understanding some of the problems inherent in multi-processing systems.

SIGNALS AND INTERRUPTS

Signals and interrupts will be briefly explained with respect to the UNIX (Trademark of AT&T) operating system which is described in an article by K. Thompson entitled "UNIX Implementation", which appeared in the Bell System Technical Journal, July-August 1978, Vol. 57, No. 6. In addition, the book Design of the UNIX Operating System by Maurice Bach, published by Prentice-Hall and copyrighted 1986, will be valuable to those who wish to understand the UNIX system more fully. It should, of course, be understood that the UNIX system is only one example of a system which could utilize the concepts taught herein. The above-cited references are hereby incorporated by reference herein.

Many operating systems, including the UNIX operating system, provide running programs the ability to detect the occurrence of asynchronous events. By asynchronous event we mean any event which occurs independently of what the running program is doing at the time the event occurs. An example of an asynchronous event is when the user pushes the break key on a terminal. Within an operating system kernel (the term kernel and its definition are found in the BSTJ article referenced above) an I/O interrupt is a common example of an asynchronous event. The UNIX system uses signals to inform running programs of the occurrence of certain asynchronous events. For purposes of this application, the term "signal" is used to refer to an arrangement for informing a program or a process of the occurrence of an asynchronous event. Some of these signals have predefined meanings, and some signals are left to be defined by user programs.

We say that a running program, sometimes called a process, is sent a signal when the occurrence of an asynchronous event is recorded in its process control block. Running processes may send each other signals by using a particular UNIX system call, or the UNIX system kernel may send signals internally to running processes. We say that a process receives the signal when the receiving process becomes the currently-running process, and the kernel detects that a signal has been sent (written in its process control block) and takes some action. Processes can be arranged into groups and the UNIX operating system will allow signals to be sent to every process in a process group.

The UNIX operating system allows a running process to specify the action the kernel should take when a process receives a signal. The default action is to terminate the process. A process may, however, request that a particular signal be ignored when it is received. Alternatively, the process may request that the kernel run a particular code segment within the user process's address space when a particular signal is received. This code segment is analogous to an interrupt handler within the kernel, which runs when the processor receives a hardware interrupt. When this code segment executes, we say that the process has handled the signal.

The treatment of signals has several facets, namely how the kernel sends a signal to a process, how the process handles a signal, and how a process controls its reaction to signals. To send a signal to a process, the kernel sets a bit in the signal field of the process control block for that process, each bit corresponding to a different signal that may be received.

In UNIX, as in many operating systems, running processes are allowed to request resources that may not be available at the time the request is made. This includes waiting for some event to transpire that has not yet occurred. The UNIX kernel will put the process "to sleep", waiting for the resource to become available or for the event to occur, when the process will be reawakened. Such sleeps are defined as breakable or unbreakable. A breakable sleep is one that can be "broken" by either the event or resource for which the process is waiting (the original reason for putting the process to sleep) or the arrival of a signal which is not currently specified to be ignored. (Remember, a process can specify which signals are to be ignored.) An unbreakable sleep is one that can be "broken" only by the event or resource for which the process is waiting. The arrival of a signal will not break such a sleep even if the signal is not being ignored by the process.

If the process is sleeping in a breakable sleep, the kernel awakens the process when a signal which is not being ignored arrives. At this point the job of the sender is complete. As will be discussed, since a signal is a single bit, a process can remember different types of signals, but it has no way to remember how many signals it receives of a particular type.

The kernel, on behalf of the currently running process, checks for receipt of a signal when a process is about to return from kernel mode to user mode and when it enters or leaves the sleeping state. The kernel, on behalf of the currently running process, handles signals only when a process returns from kernel mode to user mode. Thus, a signal does not have an immediate effect on a process running in kernel mode (except perhaps to have broken a breakable sleep). If a process is running in user mode, and the kernel handles an interrupt that causes a signal to be sent to the process, the kernel will recognize and perform the specified action when it returns from the interrupt. Thus, a process never executes in user mode before handling outstanding signals.

The process control block for the process contains two important data structures with regard to signals. The first is a 32-bit flag word, one bit for each of the 32 possible signals. Each bit is set to one (1) when a signal is sent and set to zero (0) when the signal is ignored or handled. The second data structure is a 32-word array, one word for each of the 32 possible signals. Each word records the process-specified action to be taken upon receipt of that particular signal. Notice that specifying the action with regard to one type of signal has no effect on the specification of the action for other signals.

Let us now return to a discussion of the problems of multi-processing systems. One such problem is in the area of interrupt processing when a special situation must be handled. The problem arises because a process running under control of a first processor (perhaps in response to a command, or stimuli, from a system user) will cause sub-processor, or stub processes, to be generated. These stub processes then run under control of one or more other processors.

Now, assume for a moment that a stimulus arrives at one of these stub processes requesting an immediate action. Since the system is designed so that each processor can operate independently, and since each stub process is being controlled by its own processor, an interrupt signal could easily be processed by the stub process without regard to the other processes, perhaps running under control of a different processor, which are relying on the results of the stub process.

One possible solution to this problem would be to build a system map of all processes and stub processes and their respective processors so that any processor could deal effectively with special stimuli. This solution, however, involves a vast overhead in time and control and becomes increasingly more complex as the number of processes and processors increase. Even with such a system, the situation could arise where a stub process receives an interrupt stimulus even before it begins to process the original request. Thus, if special precautions were not taken, the processors could lose signals or respond to the same signal twice. Accordingly, a need exists for an efficient and correctly functioning system of handling signals in a multi-processing system.

SUMMARY OF THE INVENTION

These and other problems have been solved by us by arranging a multi-processor system in a manner such that all signals, regardless of which processor initially sends the signal, are sent to the user process and examined by the processor on which the user process is running before any action is taken by the stub process. The user processor then must forward the proper signals to any active stub process. We have designed several algorithms for insuring that all signals are processed at the proper time and that "windows" of ambiguity, which arise because of time delays between activations of processes on different processors, do not result in lost or duplicated signals.

In one example, we have used the UNIX operating system and duplicated the system into several processors, each having user processes and kernel processes. The processors exchange information by way of packet data transfer. An extended process consists of the user portion of the process (that is, the process responsible for executing the user's program) and any stub processes which exist on other processors which act as agents for the user process on their respective processors (when the user process makes a request that must be sent to another processor). It is important to note that only one part of an extended process, either the user portion or one of its stubs, is active at any point in time.

In our example, the signal-handling code fragment is always executed on the processor local to the user portion of an extended process. Using our arrangement, the user's kernel must send the current signal result (that is, whether a signal has been received which is not being ignored) to a stub process with any stub packet, and any updated signal result must be sent to an active stub process, if any non-ignored signals are subsequently received by the user's process before the stub process responds. This is defined as the pseudo-signal state. This is necessary because the stub process could be in a breakable sleep. Such a process must be informed of any non-ignored signal sent to the extended process. In addition, the stub process must clear its copy of the signal result before going to sleep trying to obtain the user's next request, and "OR" the signal result obtained from the packet when the stub starts to process the user's request.

After the user process receives the stub process's response and is reawakened, the user process must make sure that the stub process's copy of the signal result is cleared before sending the stub process another request. This is necessary to insure that a stub process does not, due to an updated pseudo-signal state and a stub reply passing each other in mid-stream, process the same signal twice.

In addition, each kernel is arranged to maintain a linked list of table entries which have signals to be sent or forwarded and a system process running at base level that removes signals from the list and forwards them to the correct destination via a communication channel to each processor. Thus, an important aspect of our system is that each processor has a dispatchable entity referred to as the signal handler whose sole function is to forward signals to other processors.

BRIEF DESCRIPTION OF THE DRAWING

These and other objects and features, together with the operation and utilization of the present invention, will be more apparent from the illustrative embodiment shown in conjunction with the drawings in which

FIG. 10 flowcharts the function for posting signals;

FIG. 11 flowcharts the signal handler function;

FIG. 12 flowcharts the function for handling of remotely generated signals;

FIG. 13 flowcharts the function for basic stub interface control flow; and

FIG. 14 flowcharts the group signal handling function.

DESCRIPTION OF THE PREFERRED EMBODIMENT

General Description

Figure 7:
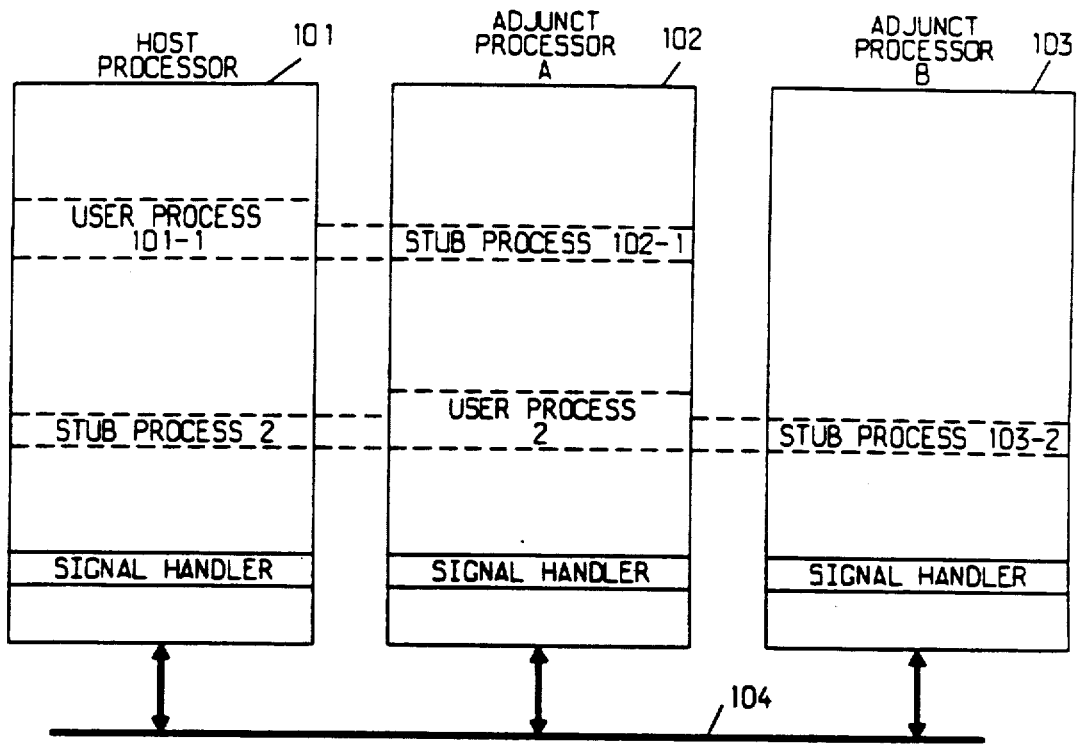
FIG. 7 shows a multi-processor system.

FIG. 7 shows a multi-processor system having a plurality of computers 101 through 103 interconnected by bus 104. Whereas the operating system kernel described by Thompson in the aforementioned reference is restricted to only a single computer, the kernels of FIG. 7 allow a process to be extended over a number of computers. This extended process is a collection of individual special processes running on separate computers and is described in greater detail in the aforementioned Bishop reference. These special processes are also referred to as primary or user and auxiliary or stub processes. Each kernel associated with the extended process maintains a distinct process necessary to allow the extended process to function on the computer controlled by the associated kernel. Each computer has associated memory and I/O devices; however, certain computers may be connected to special I/O devices such as telecommunication data interfaces or mass storage devices.

The initiation of a new program in the system illustrated in FIG. 7 results in that program being automatically assigned to an unspecified computer that has processing capacity to spare or which has special I/O resources required by the program. The unspecified computer may be the same computer executing the request or a different computer. The execution of the program can be distributed over a number of computers utilizing one computer which has processing capacity and yet using one or more computers which have the necessary files or special I/O capabilities. When program execution is distributed, an extended process is created, i.e., established.

In the previously referenced article by Thompson, it was noted that a process is a software unit which requires text, data and bss areas of memory and which is identified to the operating system by a process control block. In the operating system described by Thompson, the process control block is contained in one area of memory since that operating system is executed on a uniprocessor system. But in the system illustrated in FIG. 7, for example, the process control block is distributed among all the computers which are associated with the extended process. The extended process consists of a user process and a number of stub processes. The user process has text, data and bss areas of memory in addition to the process control block. A stub process contains only a portion of the process control block relating to operating system functions pertaining to that particular computer's operations with respect to the extended process as required at any point in time.

The extended process is an entity that dynamically adjusts to supply the required resources of the multiprocessor system to allow execution of the program. New stub processes are added to the extended process as other resources are required in different processors of the multi-processor system. The kernel of the processor executing the user process of the extended process automatically detects the need to create a stub process when a system call is made by the user process requiring resources on a new processor. The user process's kernel then communicates with the kernel of the new processor to establish a stub process on the new processor. The establishment of a stub process also includes the creation of a virtual communication channel between the user process and the new stub process. Once the communication channel is established, i.e., set up, all subsequent communication flows between the user process and the stub process via the virtual channel.

As described in the article by Thompson, the execution of a new program on a single processor controlled by the UNIX operating system is as follows. First, a fork system call is executed which replicates the executing process into child and parent processes. These processes share the same program, but have different data storage. The child process then executes an exec system call. The execution of the exec system call results in a new program being executed. A more detailed discussion of process control and formation can be found in the aforementioned Bishop reference, which reads in relevant part as follows:

Problem

The use of operating systems to control the execution of programs on a single computer or processor and the utilization of system resources such as I/O devices and memory by those programs while executing is well known in the art. One such operating system is the UNIX operating system which is described in the article by K. Thompson, "UNIX Implementation", the Bell System Technical Journal, July-August, 1978, Volume 57, Number 6. The UNIX operating system described in this article is designed to control the resources of a single processor. The execution of a new program is described on page 1933 of this article which describes the standard "fork" and "exec" system calls. The procedure is to execute the fork system call which replicates the executing process into a child and parent process. These processes share the same program, but have different data storage. The child then executes the exec system call. The execution of the exec system call results in a new program being executed. Further information on the Unix operating system is given in the book of M. J. Bach entitled The Design Of The Unix Operation System, Prentice-Hall, 1986, Englewood Cliffs, New Jersey. Other known operating systems have similar system calls.

Whereas the exec system call of the UNIX operating system described in the article by Thompson is an extremely effective mechanism for causing the execution of a new program, it is not capable of operating in a multi-processor environment where the exec system call executes on one processor but causes the new program to commence running on yet a second and unspecified processor. Operating systems for causing the execution of specialized procedures or subroutines on other processors in a multi-processor environment are known. However, these systems require that the procedure or program already exist on the other processor. One such system is described in U.S. Pat. No. 4,530,051, of J. W. Johnson et al. This patent describes a multi-processor system whereby one processor can cause the execution of a procedure, or as it is often called a subroutine, on another processor. The problem is that the procedure must already exist on the other processor before execution. A similar system is described in the article by P. Jackson, "UNIX Variant Opens a Path to Managing Multiprocessor Systems", *Electronics*, July 28, 1983. In this article, a system is described whereby a program executing on one processor can obtain access to an I/O device, such as a disk drive, by causing a procedure to run on another processor which controls the disk drive. When information is obtained from the disk drive the other processor transfers this to the requesting processor. This article does not describe the general capability of automatically causing a program to be retrieved from a disk and executed on the remote system without the program having been previously designated as existing on that system.

Another method of executing programs in a second processor from a first processor is detailed in the "Remote Procedure Call Protocol Specification" Manual, Part No. 800-1177-01, Sun Microsystems, Inc., 2250 Garcia Avenue, Mountain View, Calif., 94043. This manual gives details on the remote procedure call as implemented by Sun Microsystems, which is an addition to the UNIX operating system. The remote procedure call allows procedures to be executed on a second processor from a first processor.

The problem that exists in the prior art is that there is not a general way to cause the execution of a new program in a multi-processor system so that the system call executing that program is free of considerations dealing with the loading of the various processors within the multi-processor system, the physical location of the program whether it be in memory or in a file system, and the setting up of the necessary signaling paths if the execution of the program requires the system call performing this function to span a number of processors within the multi-processor system.

Solution

This invention is directed to solving these and other problems and disadvantages of the prior art. According to the invention, a multi-processor system is automatically responsive to a request for executing a new program thus establishing an extended process that spans a plurality of processors each having resources required for the execution of the new program. Initially, the extended process comprises a primary process that is requesting the execution of the new program. Advantageously, auxiliary processes are created as part of the extended process as required to gain access to the object code file of the new program, to allocate a processor to execute the new program, and to initialize the allocated processor for execution of the new program.

Advantageously, a method for starting the execution of a new program in a multi-processor system comprises the steps of: determining a processor associated with the object code file of the new program, creating a first auxiliary process on the determined file processor upon the file processor having been determined to be different than the initiating processor, allocating another processor for executing the object code file of the new program, creating a second auxiliary process on the allocated executing processor upon the executing processor being different than the initiating processor or file processor, transferring process information from the first primary process on the initiating process to the second auxiliary process, transforming the second auxiliary process into the primary process, and executing the object code file by the primary process in conjunction with the first auxiliary process.

Advantageously, the allocating step comprises the steps of communicating a first packet from the initiating processor to the file processor to request that the first auxiliary process read a portion of the object code file, reading the requested portion of the object code file by the first auxiliary process, and communicating a second packet containing the read portion to the initiating processor from the file processor.

In addition, the system has a designated host processor which executes a process manager function that performs processor assignment and the allocating step further comprises the steps of: communicating a third packet to the host process or to request that the processor assignment be made for the new program, assigning the executing processor to execute the new program by the host processor running the process manager function, and communicating the assignment information via a fourth packet to the initiating processor.

Also, a portion of the object code file contains a first set of processor assignment parameters and the initiating processor has a second set of processor assignment parameters stored in a subset of the second auxiliary process information and the third packet contains the first and second sets of processor assignment parameters and the assigning step further comprises the steps of reading the sets of processor assignment parameters from the third packet and designating the executing processor for the processor assignment in response to the sets of processor assignment parameters.

In addition, the process information associated with the first primary process allows the first primary process to function as the primary process of the extended process and the transferring step comprises the steps of reading the process information by the initiating processor, forming the process information into a fifth packet by the initiating process, and transmitting the fifth packet from the initiating processor to the executing processor.

Advantageously, the transforming step comprises the steps of reading the process information from the fifth packet and storing the process information into the second auxiliary process and converting the second auxiliary process into the first primary process. Also the step of converting changes the original first primary process into a third auxiliary process. In addition, the step of converting further comprises the step of sending a sixth and a seventh packet to the first and third auxiliary processes, respectively, to inform the latter processes that the second auxiliary process has become the primary process and that the former primary process is now the third auxiliary process.

These and other advantages and features of the present invention will become apparent from the following description of an illustrative embodiment of the invention taken together with the drawing.

DETAILED DESCRIPTION

Figure 1:
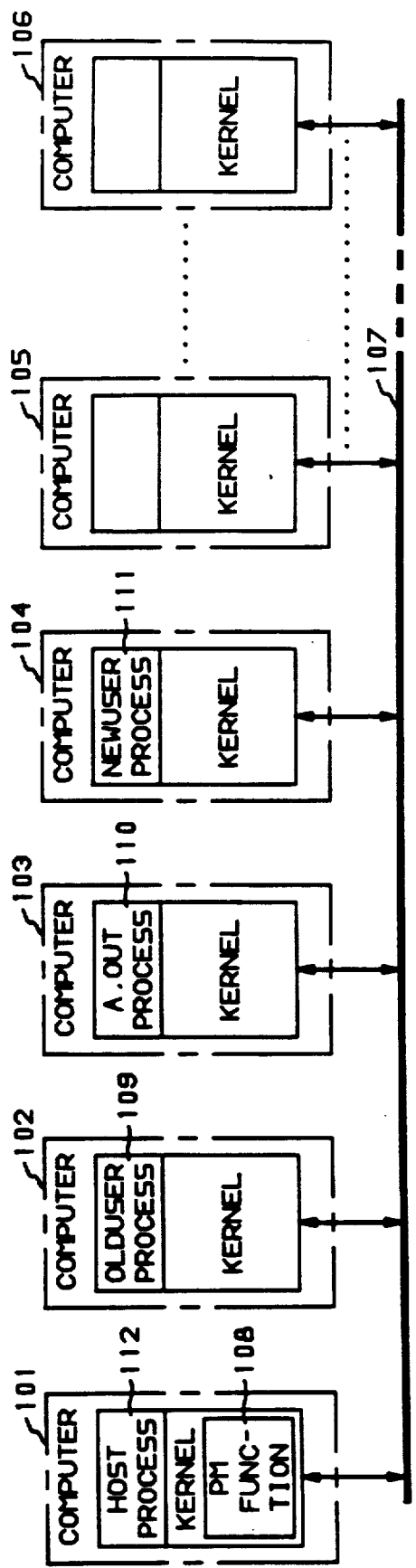
FIG. 1 illustrates, in block diagram form, a multiprocessor system for utilizing the invention of the aforementioned Bishop reference.

FIG. 1 shows a multi-processor system having a plurality of computers 101 through 106 interconnected by bus 107. Some of the computers illustrated in FIG. 1 have particular functions. For example, computer 101 is considered to be the host computer, and computers 105 through 106 may be designated as computational servers or file servers. Each computer operates under control of an operating system kernel which illustratively is a version of the UNIX operating system described in the article by Thompson. Whereas the operating system kernel described by Thompson is restricted to only a single computer, the kernels of FIG. 1 allow a process to be extended over a number of computers. This extended process is a collection of individual special processes running on separate computers and is described in greater detail later in this section. These special processes are also referred to as primary or user and auxiliary or stub processes. Each kernel associated with the extended process maintains a distinct process necessary to allow the extended process to function on the computer controlled by the associated kernel. Each computer has associated memory and I/O devices; however, certain computers may be interconnected to special I/O devices such as telecommunication data interfaces or mass storage devices.

The initiation of a new program in the system illustrated in FIG. 1 results in that program being automatically assigned to an unspecified computer that has processing capacity to spare or which has special I/O resources required by the program. The unspecified computer may be the same computer executing the request or a different computer. The execution of the program can be distributed over a number of computers utilizing one computer which has processing capacity and yet using one or more computers which have the necessary files or special I/O capabilities. When program execution is distributed, an extended process is created. The operation of initiating the execution of a program so as to allow the execution of the program to be performed among a plurality of computers and yet making this operation transparent to the application programmer is the subject of this invention.

The allocation of resources and dynamic load balancing is performed by process manager (PM) function 108 being executed by computer 101 which is designated as the host computer of the system of FIG. 1. The initiation of the execution of a new program is performed by the exec system call that is modified by this invention so as to allow the operation on a multi-processor system. Consider the following example which illustrates the execution of the exec system call. Olduser process 109, on computer 102, executes the exec system call. The end result is that the new program is eventually executed by newuser process 111 on computer 104. Initially, the file containing the new program is in the file system of computer 103 and is accessed by a.out process 110. Computers 105 and 106 also have resources that will be utilized by newuser process 111.

In the previously referenced article by Thompson, it was noted that a process is a software unit which requires text, data and bss areas of memory and which is identified to the operating system by a process control block. In the operating system described by Thompson, the process control block is contained in one area of memory since that operating system is executed on a uniprocessor system. In the system illustrated in FIG. 1, the process control block is distributed among all the computers which are associated with the extended process. The extended process comprises processes 112, 110, 111 and possibly processes located in computer 105 and 106 after the exec system call is finished. The extended process consists of a user process and a number of stub processes. The user process has text, data and bss areas of memory in addition to the process control block. A stub process contains only a portion of the process control block relating to operating system functions pertaining to that particular computer's operations with respect to the extended process as required at any point in time.

Upon olduser process 109 executing the exec system call, the kernel of computer 102 transmits a packet to computer 103 to obtain the header portion of the a.out file via a.out process 110 so as to determine the type of resources required to execute this program. The kernel of computer 102 then transmits a packet to the kernel of computer 101 requesting allocation of resources for the execution of newuser process 111. In response to this request, the kernel of computer 102 executes process manager function 108. In our present example, the kernel of computer 102 transmits back a message designating that computer 104 is to execute newuser process 111 after executing process manager function 108. Further information concerning the operations of process manager function 108 is illustrated in the copending application of Bishop et al., Case 7-3-4-4. The kernel of computer 102 then transmits process control information to the kernel of computer 104 so that the latter kernel can setup newuser process 111 and stub processes in computers 102, 105, and 106 for the future execution of the extended process.

Once this initialization has been performed, the kernel of computer 102 passes the execution of the exec system call to the kernel of computer 104. The latter kernel obtains the a.out file from computer 103. The kernel of computer 104 also transmits messages to the kernels of the other computers informing them that the user process which was initially olduser process 109 has migrated to computer 104 and is now newuser process 111. Olduser process 109 now becomes a stub process. The kernels of the other computers will now direct any signals for olduser process 109 to newuser process 111. Further, the kernel of computer 104 transmits a message to the kernel of computer 102 to recover all signals transmitted to olduser process 109 that arrived at computer 102 before the other computers were informed that the extended process had migrated to computer 104. Once newuser process 111 has been set up and begins to execute, it can utilize the resources of the other computers as required via stub processes that were created in these computers. If, during the execution of the program, it is necessary to access a computer that was not initially designated as being part of the extended process, then the operating system of computer 104 requests the creation of a stub process on that computer necessary to continue execution of the program.

Figure 2:
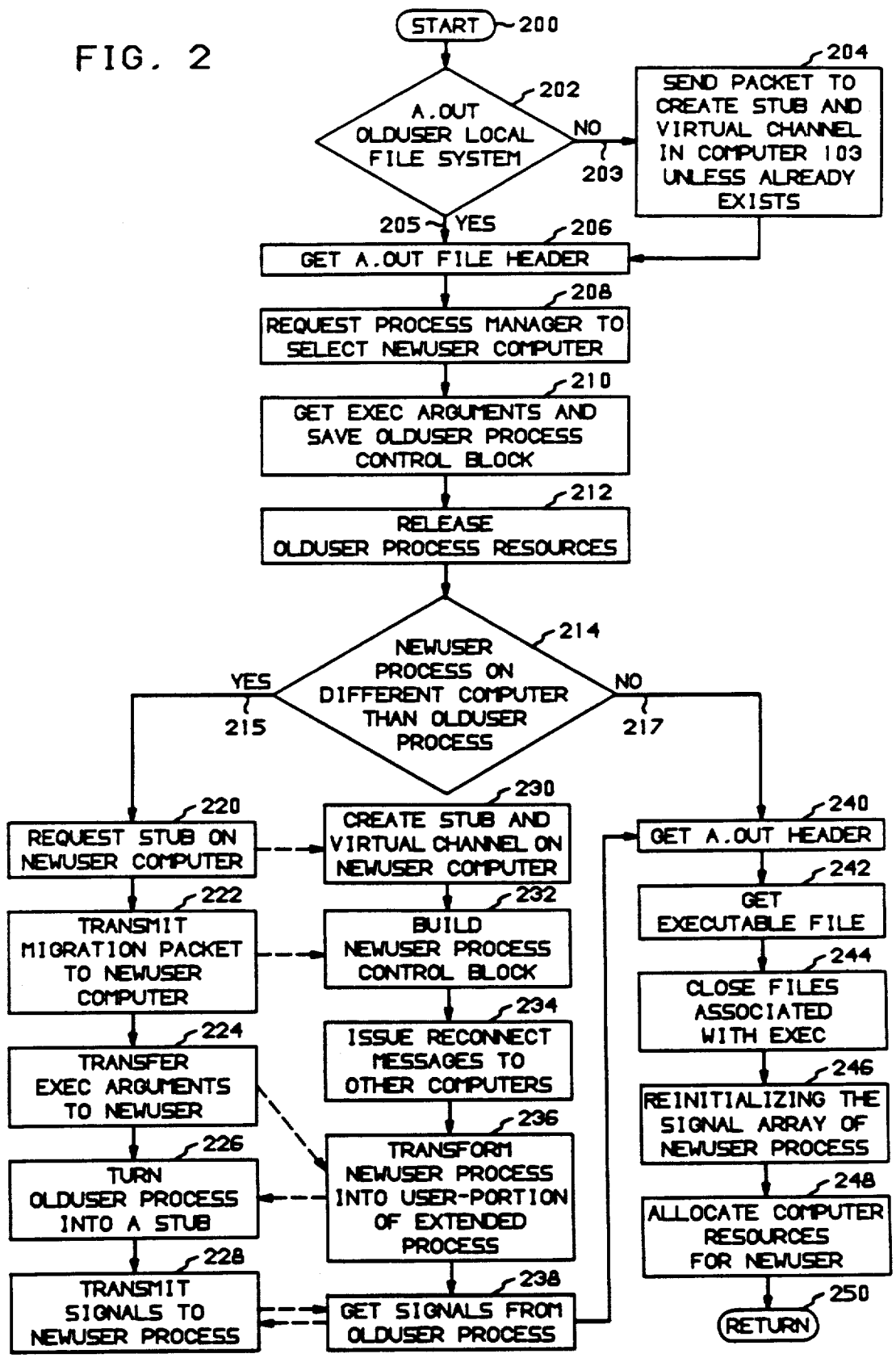
FIG. 2 illustrates, in flowchart form, the functions performed during the execution of an exec system call by the multiprocessor system of FIG. 1.

FIG. 2 illustrates in greater detail the execution of the exec system call and creation of the extended process for the present example. Upon execution of the exec system call by olduser process 109, decision block 202 is performed. The exec system call may specify parameters for influencing the processor assignment. Decision block 202 determines whether or not the file containing the a.out file is local to computer 102 or is on a remote computer. Since the file is on computer 103 in the present example, it is remote; and if a stub process does not already exist on computer 103 for the present extended process, a packet is sent to create a stub process on computer 103. In response to the packet, the kernel of computer 103 creates a.out process 110 that allows access to the a.out file. a.out process 110 then becomes part of the extended process. Block 206 accesses the a.out file located on computer 103 via a.out process 110. The header information is read from the a.out file and is stored in the process control block of a.out process 110. The kernel of computer 103 then transmits a subset of the header to computer 102's kernel which stores the subset in the process control block of olduser process 109 in computer 102. The information obtained from the a.out file at this point specifies the size of the a.out file and may specify parameters for influencing the processor assignment decision. After obtaining the information from the a.out file, the kernel of computer 102 transmits a packet to the kernel of computer 101 requesting that the kernel execute process manager function 108 to select a computer upon which newuser process 111 is to assigned at block 208. This packet contains the information obtained from the a.out file in block 206 and any parameters regarding processor assignment in the exec system call. PM process manager function 108 is responsive to this packet to validate an explicit assignment if one existed in the a.out or exec system call information or to perform a dynamic load balancing for the multi-processor system illustrated in FIG. 1 in order to make a processor assignment for newuser process 111. In the present example, newuser process 111 is assigned to computer 104.

Next, the kernel of computer 102 executes block 210. The execution of block 210 results in the arguments of the exec system call being read. The kernel of computer 102 is responsive to these arguments and any environment variables from the olduser process 109's address space to transfer this information into a system work area formatting this information into an initial stack for newuser process 111. Block 212 is next executed which releases the resources of olduser process 109 back to the operating system of computer 102. In particular, the address space of olduser process 109 is released.

The actions just performed represent a pre-execution stage of the exec system call. If the newuser process is present on a different computer than the olduser process, then blocks 220 through 238 are executed before blocks 240 through 250. In the present example, the kernel of computer 102 executes blocks 220 through 228, and the kernel of computer 104 executes blocks 230 through 238. However, if the olduser and the newuser processes are on the same computer, then the blocks 240 through 250 illustrated in FIG. 2 are executed at this point in time. Decision block 214 determines whether or not the newuser and olduser processes are on different computers. In the present example, olduser process 109 is on computer 102 and newuser process 111 is on computer 104. If a stub process does not already exist on computer 104, the kernel of computer 102 executes block 220 which results in a packet being transmitted over to the kernel of computer 104. This packet requests that a stub process be created which will become newuser process 111 on computer 104. The kernel is responsive to this request to create a skeleton stub process by performing a kernel fork function on a prototype stub process. Each kernel of FIG. 1 maintains a copy of the prototype stub process for the purpose of creating stub processes. The kernel of computer 102 then executes block 222. The latter block results in the transmission of a migration packet from computer 102 to computer 104. The packet contains the initial process control information for newuser process 111. That information was formatted in block 210. The migration packet contains the information necessary to transform the stub for newuser process 111 on computer 104 into a viable user process of an extended process. Viability is defined here to mean that the newuser process has all the information necessary to exit or terminate gracefully if required. A graceful exit is one where all parts of the extended process can be removed from all the computers of FIG. 1 if it is necessary to terminate the extended process.

The principal information contained in the migration packet is the reconnection data for the stub processes and information defining open files of the extended process. This data is used to reattach the stub processes and files that had been attached to olduser process 109 to newuser process 111. The reattachment is performed by rearranging the virtual channels and discussed with respect to FIG. 3. Certain crucial data from the process control block defining process group ID, parent process ID, flagword, user ID, group ID, current directory, private root directory, new argument pointer, and various timekeeping fields are also communicated via the migration packet. The kernel of computer 104 is responsive to the migration packet from olduser process 109 to install the data contained in this packet in the newuser process 111's control block and to issue reconnect messages to all of the stub processes in the other computers. After block 232 and 234 have been performed, the newuser process 111 is considered viable.

The reconnect messages transmitted by block 234 to the other computers cause the kernels of these other computers to transform those computers' portion of the process control block of the extended process to now point to newuser process 111 in computer 104 rather than olduser process 109 in computer 102. The significance of this reconnection is that any signals generated for the extended process by stub processes of other computers are now transmitted to newuser process 111 rather than to olduser process 109.

The operating system of computer 102 now executes block 224 which results in the transfer of the exec arguments and other information to newuser process 111 via the kernel of computer 104 by a series of packets from the kernel of computer 102. The newuser process 111 is then built up by installing these packets into the newuser process 111 address space on computer 104 by the kernel of computer 104. This transforms the newuser process 111 into a more complete user process of the extended process.

The kernel of computer 104 then executes block 236 that sends a message to computer 102 causing the execution of block 226 which results in olduser process 109 being turned into a stub process. The kernel of computer 104 then transmits a request at block 238 to the kernel of computer 102 for all signals destined for the user process of the extended process that may be stored for olduser stub process 109 in computer 102. Computer 102's kernel responds to this message by executing block 228 which transmits these signals to block 238.

The kernel of computer 104 now executes the blocks 240 through 250 in FIG. 2. These latter blocks are executed in the same manner regardless of whether or not the olduser process and the newuser process are on the same computer. First, the kernel accesses the a.out file located on computer 103 via a.out process 110 to obtain the a.out header by execution of block 240. Utilizing the header information, the kernel of computer 104 builds the newuser process 111's address space, including space for text, data, and bss, by loading the various sections from the a.out file into computer 104 from computer 103 by execution of block 242.

After performing this function, the kernel then executes block 244 so as to close any files which were associated with olduser process 109 but will not be associated with newuser process 111.

Figure 4:
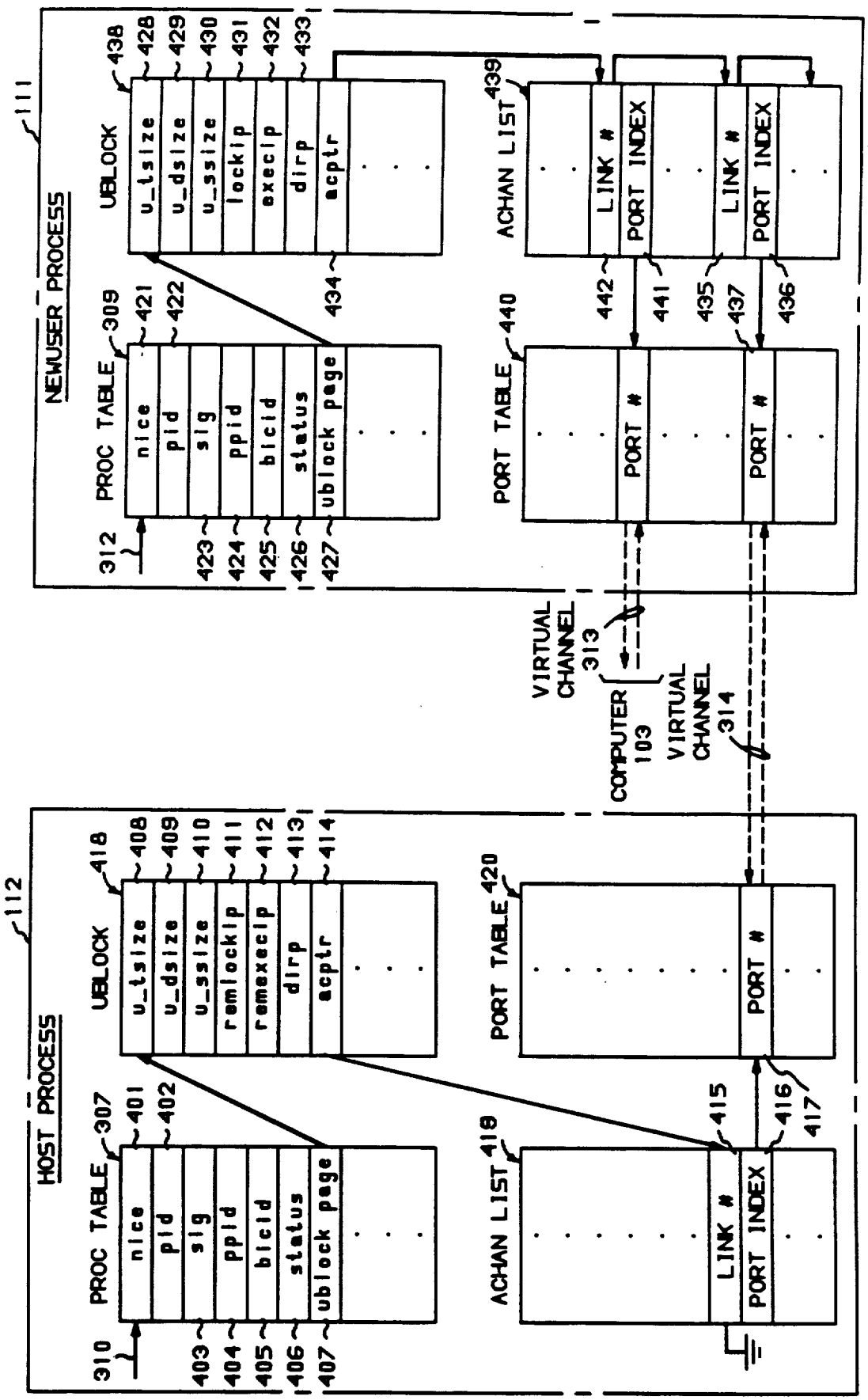
FIG. 4 illustrates, in greater detail, the software interconnection of FIG. 3.

The files that are to be closed are determined by the application programmer. The programmer marks the files to be closed in a standard UNIX manner using the fcntl system call prior to execution of the exec system call. This information is stored in the process control block of olduser process 109 and is later transferred to newuser process 111. After closing all of the marked files, the kernel of computer 104 executes block 246 so as to reinitialize the array of signal-handler fields which contain an entry defining the action to be taken upon receipt of a signal. Each entry can specify one of the following: default value, ignore value, and a pointer identifying a function that services that particular signal. The signals were transmitted from computer 102 to computer 104 in block 228 and combined with signal entry 423 in block 238. The block 246 sets all entries in the signal array pointing to functions to the default value but any entry that contains an ignore value is not modified. When a signal is received for a process, the kernel accesses the process control block for that process and stores the signal in the sig entry, such as entry 423 as illustrated in FIG. 4. When a signal is handled by the kernel, the signal number is used as an index to access the signal array. If the default value is accessed, the process will normally terminate. If the accessed entry contains the ignore value, no action is taken. If the accessed entry contains a pointer, then the function identified by the pointer is executed. When the application runs, the signal system call will be used to configure the array to the requirements of that program. Further information on the handling of signals can be found in the aforementioned book of Bach. Next, the kernel of computer 104 executes block 248 which reinitializes any memory management information required for newuser process 111's new address space and completes all other housekeeping chores. Finally, control is turned over to newuser process 111 so that the program can now execute at block 250.

Figure 3:
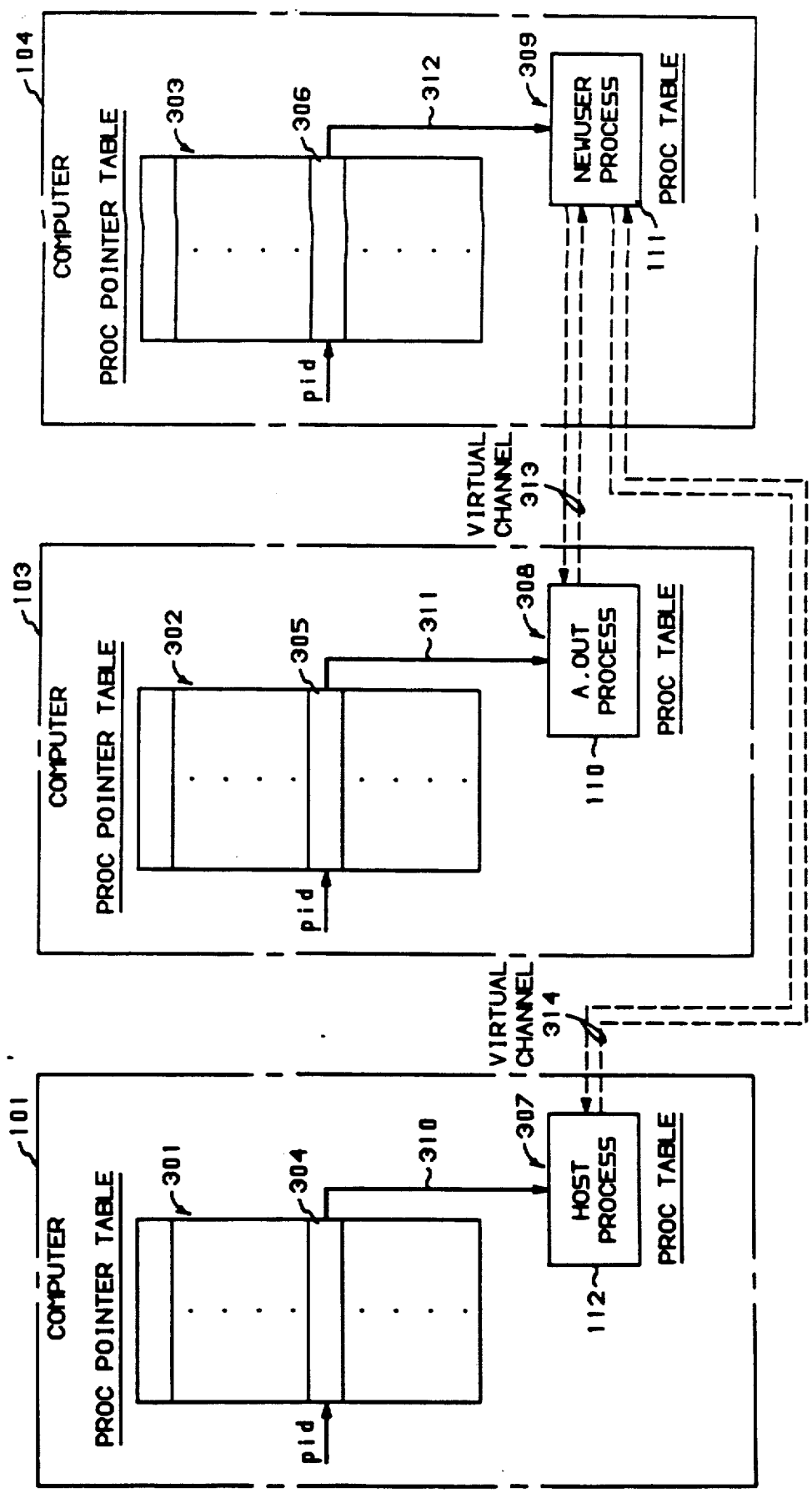
FIG. 3 illustrates, in block diagram form, the interconnection of an extended process for a subset of the processors of FIG. 1.

FIG. 3 illustrates in greater detail a portion of the extended process resulting from the execution of the exec system call. New process 111 is the user process of the extended process and processes 112 and 110 are stub processes of the extended process. All processes of the extended process share a common pid number. Virtual channels are established between the user process of the extended process and the stub processes at the time the stub processes are established. Those channels are utilized for the communication of packets between the user process and the stub processes. Stub processes of the extended process do not directly communicate with each other. In addition, all communication from other processes within the system illustrated in FIG. 1 are directed to the user process of the extended process. Each of the computers illustrated in FIG. 1 maintains a proc pointer table such as 301 through 303 of FIG. 3. The pid number is utilized by the kernel to point into a proc pointer table such as tables 301 through 303 to obtain the pointer such as 304 through 306 to find the designated process. For example, the pid number in computer 104 is used to access entry 306 from proc pointer table 303 that points to proc table 309 via path 312. Similarly, the pid number utilizes to access entry 304 of proc pointer table 301 to obtain path 310 to proc table 307.

Virtual channels 313 and 314 are directly associated with the processes. The identification of these channels is established within the proc table of the individual processes. A user process of the extended process has a virtual channel to each of the stub processes. However, each stub process of the extended process, such as host process 112, has only one virtual channel; and that channel is to the user process of the extended process, such as newuser process 111.

FIG. 4 illustrates in greater detail the memory utilized by host process 112 and newuser process 111 and further demonstrates the differences between a user and stub processes of the extended process. For each of the latter processes, portions of the proc table and the ublock are illustrated. In addition, the port tables and the achan lists are shown. These latter tables identify the virtual channels between the processes. Not illustrated for newuser process 111 are the text, data, and stack areas that are utilized by this process during execution. Similarly, the stack area of memory is not illustrated for host process 112 which is a stub process of the extended process. Newuser process 111 is the user process of the extended process.

Consider now in detail the entries of proc tables 307 and 309. The entries illustrated for tables 307 and 309 are only a portion of the entries that would exist in these tables. The nice entry 401 or 421 defines the scheduling priorities of a process. Nice entry 401 is fixed on a system-wide basis by the system administrator which is true for all stub processes. Since nice entry 421 is for a user process, it is adjustable by the user executing a specific system call allowing the level of priority to be reduced or by actions taken by the system administrator or superuser which can increase or decrease the level of priority. Entries 402 and 422, pid, define the process identification number which is the same for both entries. The pid number is given on an extended process basis so that the user process and all stub processes of the extended process have the same pid number.

The sig entries 403 and 423 coupled with the status entries 406 and 426 are used to handle signals between processes. In addition, the status word of the proc tables also contains conventional UNIX system type information. On a stub, the signals flags contained in the status word indicate whether or not a signal has been received from the user process which in the present example is newuser process 111. Host process 112 is responsive to the receipt of a signal that is stored in entry 403 to perform different operations depending on whether the present operation is interruptible or not. In newuser processor 111, the signal flags in status entry 426 are used to indicate whether a signal has been transmitted to host process 112. In addition, the signal flags in entry 426 also keep track of whether or not the message was ever sent to a stub process such as host process 112. This latter indication is utilized to facilitate cleanup of different types of operations at a latter point in time. The type of signal that is received is stored by newuser processor 111 in sig entry 423.

With respect to the parent pid (ppid) entries 404 and 424, these entries are used to keep track of the identity of the parent process of the extended process. This is a conventional UNIX system type field. However, in the extended process, the ppid entry is only valid on the process of the extended process that is being executed by host computer 101 which is host process 112 in the present example. Advantageously, this reduces the amount of communication of packets between various stubs and the user process of the extended process. The user process of the extended process does not have a valid ppid entry unless the user process of the extended process is resident on the host computer.

The bicid variable is used in the following manner to determine whether or not a particular process is a stub or user process of the extended process. Each processor of the multi-processor system illustrated in FIG. 1 stores the processor's identification number in a variable MYLOC whose contents is the identification number of the processor. Regardless of whether it is a stub or user process, the bicid variable always contains the identification number of the processor that is executing the user process of the extended process. In the present example, this is computer 104. Entry 425 is identical to the contents of the MYLOC variable maintained by the kernel of computer 104. Entry 405 also contains the contents of the MYLOC variable of computer 104, and hence does not match the MYLOC variable of computer 101. The kernel of a particular computer determines whether or not it is executing the user or stub process by comparing its bicid variable with the MYLOC variable. If a match results, then the kernel is executing the user process of the extended process.

The ublock page entries 407 and 427 contain address information to setup a virtual address to gain access to the ublocks which are illustrated as ublocks 418 and 438 in FIG. 4. The latter ublocks contain different information depending on whether the ublock is the stub process of the extended process, such as host process 112, or the user process of the extended process, such as newuser process 111. Advantageously, many of the entries of these ublocks are similar to those for the ublocks for the UNIX system described in the aforementioned article by Thompson. Entries 408, 409, and 410 contain zero for the host process 112 since a stub process of the extended process has no text, stack or data memory areas. When the kernel is performing functions associated with the stub process, the kernel maintains a kernel stack unique to that stub process in the ublock of the stub process. This is similar to the manner in which the kernel stack is maintained in a single processor UNIX system when the process is executing in the kernel mode. Entries 428, 429 and 430 contain the necessary information so that the user process of the extended process, newuser process 111, has a text area, data area and a stack for the execution of the program that was obtained from the a.out file as described earlier.

In the user process of the extended process, the variables lockip and execip, entries 431 and 432, respectively, are used to identify the old and new a.out files. In the present example, computer 103 is storing the new a.out, and computer 103 is storing the old a.out file. Entry 431 points to the old a.out file, and entry 432 points to the new a.out file which is executed as a result of the exec system call. If both files are local to the processor executing the user process of the extended process, then these entries are pointers which point into the inode table maintained by the kernel of the local processor in a standard UNIX system manner to identify the local files. The system file table is not used since the a.out files are not used by the process directly but rather by the kernel. However, if the file is remote, e.g. associated with another processor, the entry contains an identification of an entry in the user process port table such as port table 440. For example, this entry in port table 440 then identifies the virtual channel and remote entries such as 411 or 412 are identified in a stub process of the extended process. For example, if entry 431 indicates a remote file, then it points to a corresponding entry 411 in the stub process associated with the processor that is local to the remote file. More information concerning these entries is given with respect to FIG. 6.

In general, the ublock of a stub process of the extended process contains three types of entries with respect to the ublock of the user process. The first type is entry 408 which is never used in the stub process but is used in the normal way in the user process. The second type of entry in the ublock of the stub process is an entry which is always used, and an example of this is the acptr entry 414 which is described in greater detail later in this section. The third type of entry in the ublock of the stub process is an entry which is only populated as needed with the necessary information being transferred over from the user process of the extended process when the requesting packet to perform a particular function is transmitted from the user process to the stub process. One example of this is the dirp entry 413, and other examples are entries 411 and 412. The entry 413 is a pointer which points to the path name. In the user process of the extended process, this entry always points into the users address space to designate the path name. However, in a stub process, the information concerning the path name is received from the user process and is then stored by the kernel at a convenient location. At this point and time, the kernel sets the dirp entry to point to the path name. An example of when the path name is transmitted is during an open system call. Since the open system call is executed on the processor executing the user process of the extended process, the path name information is not available on the stub process.

The acptr entries 414 and 434 point to the achan list 419 and 439, respectively. An achan list of a user process may have a multitude of structures each defining a virtual channel to a stub process. In the present example, newuser process 111's achan list 439 has a number of structures with each defining a virtual channel to a stub process of the extended process. Each structure comprises link and port pointers and other information for virtual channel operation. These structures are linked together by the link pointers 442 and 435 in a link list. The list is terminated upon the contents of the last link pointer being a null. The virtual channels are identified by the port pointers. The port pointers 431 and 436 point into port table 440. The newuser process 111 identifies the virtual channels associated with it by utilizing acptr entry 434 to point into the link list associated with newuser process 111 in achan list 439. The port pointers then are utilized to access port table 440. Host process 112 similarly has acptr entry 414 which points into the structures containing pointers 415 and 416 of achan list 419. Since a stub process of the extended process can never have more than one virtual channel, the link pointer 415 terminates the link list since the contents of pointer 415 are null. Port number 417 defines virtual channel 314 to newuser process 111. Further detail concerning the virtual channels is given in the copending application of Bishop et al., Case 4-2-1-3-2 which is hereby incorporated by reference.

Figure 5:
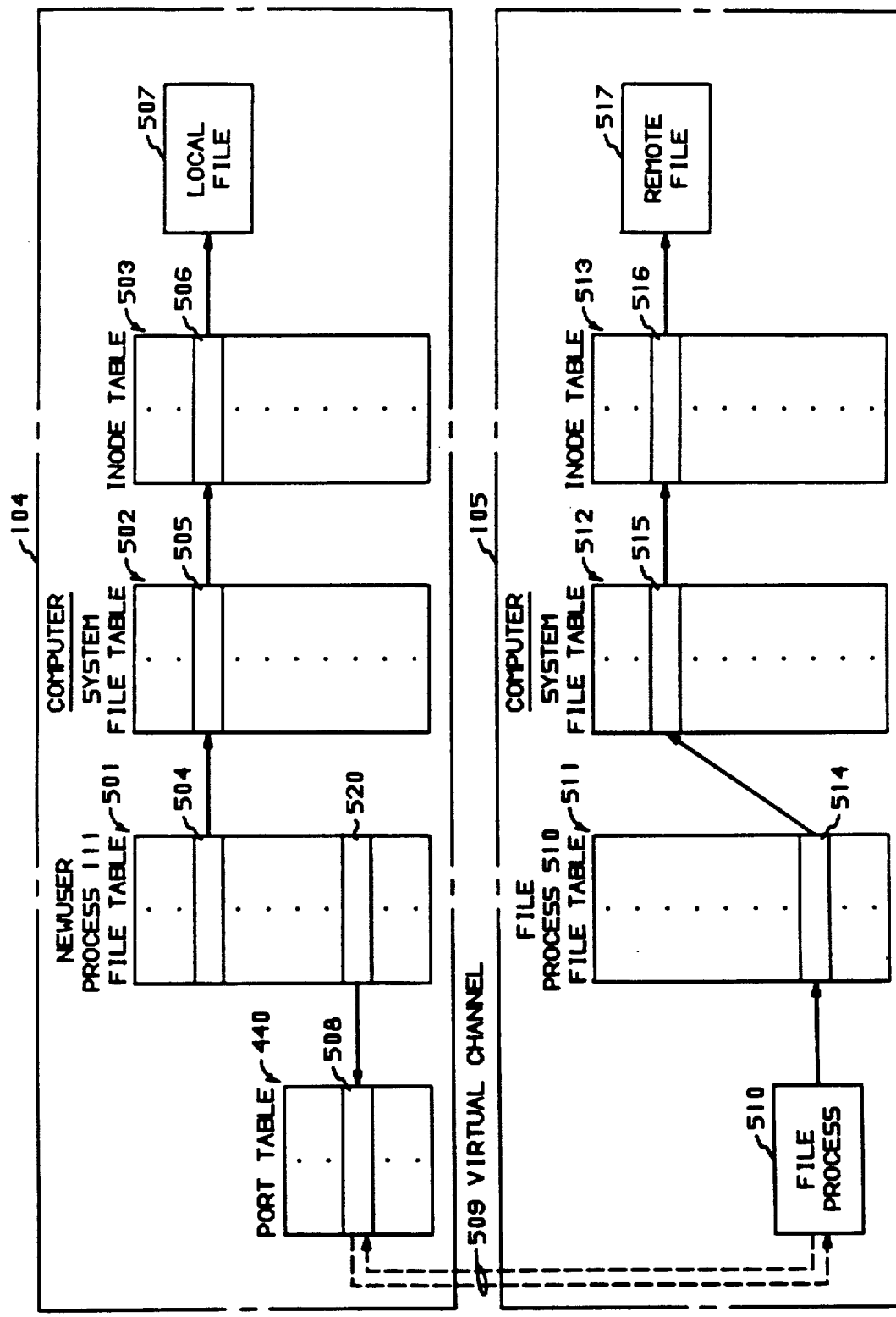
FIG. 5 illustrates, in block diagram form, the file control structure for an extended process executing on the processors of FIG. 1.

Consider the virtual channels in light of blocks 234 and 236 of FIG. 2. When the reconnection information is initially transmitted by block 234, the stub processes of the extended process have virtual channels set up with olduser process 109 which at that point in time is the user process in a similar manner as illustrated in FIG. 4. Upon receiving the reconnect information, each receiving kernel updates the port table and the other channel information resulting in the stub process' virtual channel being connected to newuser process 111 rather than olduser process 109. Part of operations performed by block 236 is to transform achan list 439 and port into the tables illustrated in FIG. 4. Block 226 changes olduser process 109's tables into tables similar to those illustrated for host process 112 in FIG. 4. FIG. 5 illustrates the manner in which the files of the extended process are identified by the user process of the extended process. If a file is local to the processor that is executing the user process of the extended process, such as computer 104 and newuser process 111, then the standard UNIX system file control structure is utilized. For example, local file 507 is identified via entry 504 of file table 501. The latter table is part of the ublock of structure. The contents of entry 504 in turn identify entry 505 of system file table 502. The system file table 502 is then utilized to point to inode table 503 and entry 506. Entry 504 is identified in table 501 by using the file descriptor number associated with file 507 in a normal UNIX system manner. Entry 506 then identifies the local file 507 in a normal UNIX system manner. If the file is remote such as remote file 517, which is assumed to be local to computer 105, then entry 520 identifies that this file is remote and rather than pointing into system file table 502, points into port table 440. The file descriptor number for file 517 is used to access entry 520. Entry 508 is identified in table 440 by entry 520 of port table 440 which identifies virtual channel 509. Virtual channel 509 is interconnected as previously described into file process 510 which is a stub process of the extended process. A packet containing the file descriptor number for file 517 is transmitted to the kernel of computer 105. The latter kernel uses the file descriptor number to identify entry 514 of file table 511 which is in the ublock of file process 510. The file control structure then identifies remote file 517 in a normal UNIX manner via entries 515 and 516 in tables 512 and 513, respectively.

Figure 6:
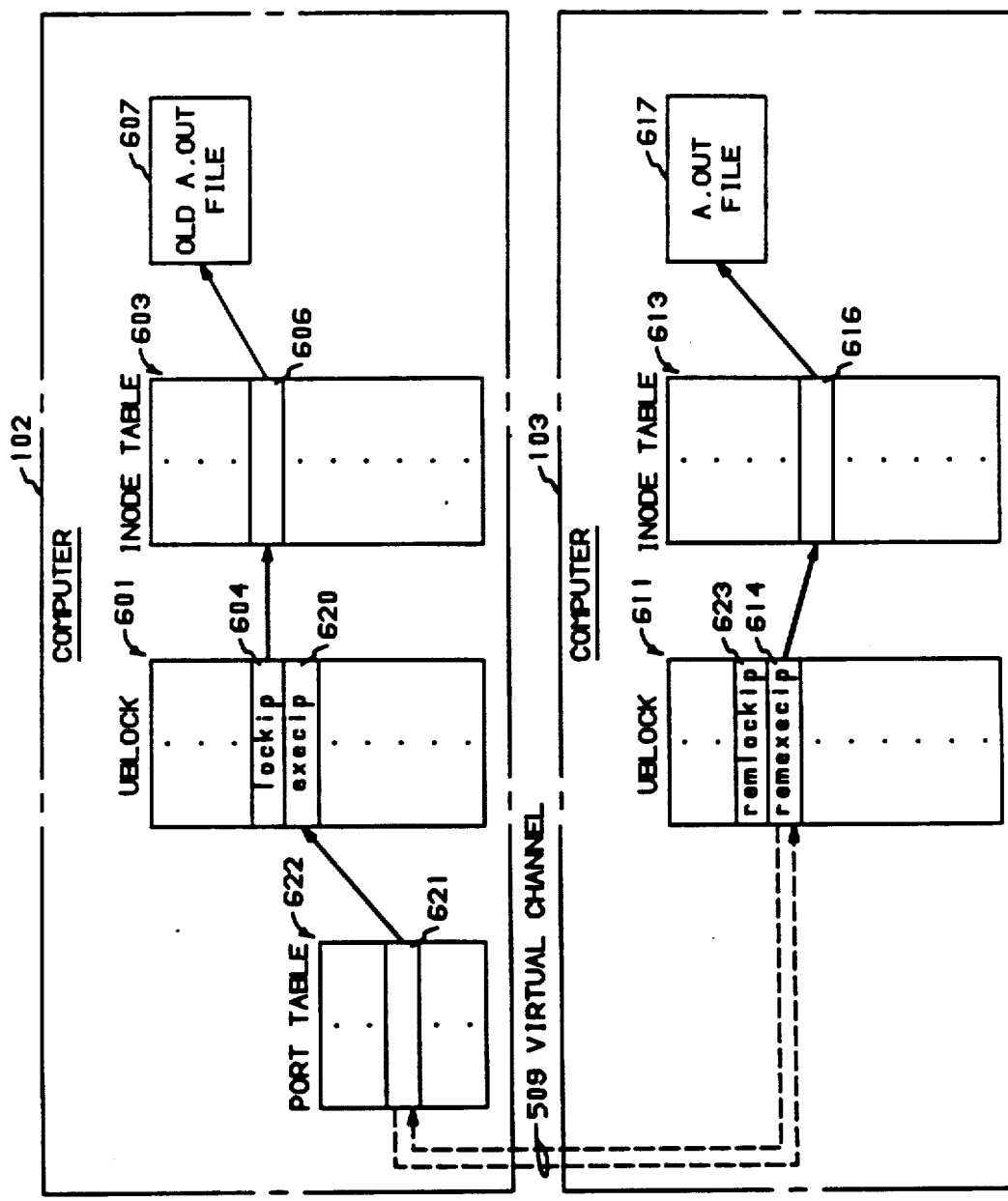
FIG. 6 illustrates, in block diagram form, the file control structure for accessing a.out files for an extended process executing on the processors of FIG. 1.

FIG. 6 illustrates in greater detail the utilization of the lockip and execip variables in the user process of the extended process and the remlockip and remexecip variables in a stub process of the extended process. FIG. 6 shows that the state of the multi-processor system illustrated in FIG. 1 before the execution of block 224 of FIG. 2. At this time, the user process of the extended process is olduser process 109 being executed by computer 102. FIG. 6 assumes that the original a.out file which was used to execute the exec system call, is local to computer 102. In the present example, the original a.out file is old a.out file 607. The new a.out file from which the new program is to be obtained is remote and is associated with computer 103. This file is denoted as a.out file 617. The stub process of the extended process being executed on computer 103 is a.out process 110. Illustrated for olduser process 109 is its ublock 601 and port table 622. Illustrated for a.out process 110 is its ublock 611. Entry 604 of ublock 601 of olduser process 109 identifies old a.out file 607 in a standard UNIX system manner utilizing entries 604 of ublock 601 and entry 606 of inode table 603. Since the lockip variable identifies a local file, there is no corresponding remlockip variable used in any stub process associated with the extended process.

The new a.out file, however, is remote from computer 102. Entry 620 of ublock 601 rather than pointing into inode table 603 points to entry 621 in port table 622. Entry 621 identifies virtual channel 509 which is connected to ublock 610 of a.out process 110. Entry 614 of ublock 610 then points entry 616 of inode table 613 to a.out file 617. Since the old a.out file is local to computer 102, entry 623, remlockip variable, is not utilized in ublock 611.

DETAILED DESCRIPTION

Returning to this application, the solution, as discussed above, to the problems of multi-processing, can be implemented by modifying the basic UNIX operating system as detailed below.

The following are additions or modifications to the process control block which, as discussed above, is the basic process data structure used within the UNIX operating system.

p_flag - This a a 32-bit integer used to contain boolean flags indicating the state of a process. New flags can be added as follows:

SSACT This flag indicates a stub process is currently active, therefore, the user portion of the extended process waiting for the active stub process to respond before the user portion may continue.

SSISG This flag represents the pseudo-signal state (as will be discussed hereinafter) for an active stub. On user processor, this is the last signal state sent stub. On the stub processor, this is the pseudo-s which, if TRUE (on), will break a breakable sleep.

SSSIG This flag indicates that an update to the pseudo-sign was sent to the stub after the original request was sent to the stub and, thus, a final pseudo-signal clear request must be sent at the conclusion of the request in order to clean-up.

SSIGP This flag indicates that a group signal is posted aga a process and must be forwarded to the processor which records information about process groups. p_siglink - The field used to link processes on the Siglink list for received signals to be forwarded by a special kernel process to the currently active portion of an extended process.

p_siggrp - The summation of group signals currently posted against a process which have not yet been forwarded.

p_port - If SSACT is on, then this field is populated with information which identifies the processor where the active stub resides.

p_bicid - This field is used to distinguish internally between a stub and a user process. The field contains the identification code of the processor where the user resides.

Shown in FIG. 7 is a multi-processor system, having processors 101, 102 and 103 connected together by bus 104. The kernels which run on these processors run in a more or less dependent fashion. For our example, processor 101 will be deemed the host processor since we will assume that the user process resides on that processor. We have defined a user process as being an extended process meaning that the user code resides on one of the processors (for example, the host processor), and sleepable entities called stub processes, or stubs, reside on other processors. The stub process controls some resource required by the user process. In our system, it is assumed that all processes in the system must either be located on the host processor or at least have a stub residing there. Thus, the host (process manager) processor is the one processor having knowledge of the locality of every user process in the complex, and also the one processor having knowledge of the process groups. Thus, process group signals are always first sent to the host processor.

When a user process, such as process 101-1, requires a remote resource, a request is sent over bus 104 to its associated stub, such as stub 102-1 on the required processor. A response from stub 102-1 is always expected, thus user process 101-1 will drop into an unbreakable sleep awaiting the response.

Figure 8:
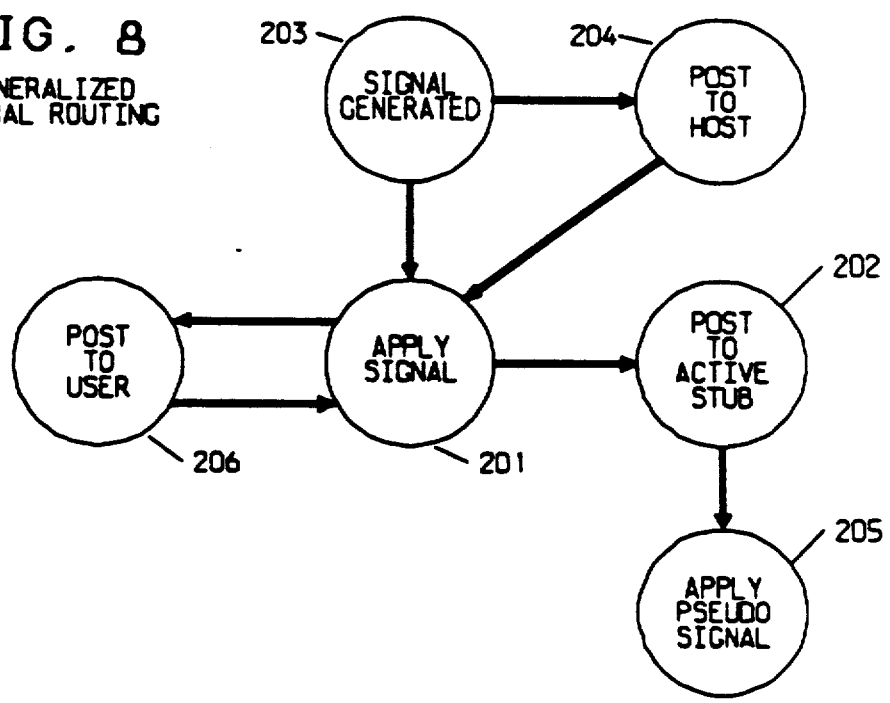
FIG. 8 shows a signal state diagram chart.

Signals are applied in each processor by inserting the signal into the appropriate data structure and breaking breakable sleeps. In the context of FIG. 8, there is shown the concept of forwarding the signal to another processor in the system. This is referred to as "posting" and is shown in the transaction between nodes 201 and 202. In FIG. 8, "apply signal" node 201 corresponds to the flowcharts shown in FIGS. 9 and 12.

At the arrival of a signal for a process in the system, as from node 203, if the process is locally known, the signal is applied to the process locally at node 201, and, if the process is not locally known, the signal is routed to the host processor at node 204 which does know the location of all processes. The host processor then applies the signal at node 201. As mentioned previously, regardless of which processor initially sends a signal, the signal is sent to the user process. Hence, if the signal is applied at node 201 to a process other than the user process (i.e., a stub process), it is posted to the user process, at node 206, by routing it to the user process. The signal is then applied to the user process, at node 201. Also as mentioned previously, the signal is examined by the processor on which the user process is running before any signal-handling action is taken by the stub process. The user processor then must forward the proper signals to any active stub process, at node 202. The forwarded signal is then applied to the stub as a pseudo-signal at node 205.

As mentioned previously, FIG. 9 represents activity occurring at node 201 of FIG. 8. In response to the generated signal, a PSIGNAL() function is invoked, at step 301, and the process has the signal applied thereby to its control block signal word P-SIG, at step 302. If the user process is local, at step 303, and, if the disposition of the signal is such that it would break a breakable sleep at step 307, and the user process currently has a stub request outstanding (i.e., the user process is in an unbreakable sleep at step 304 and an active stub exists at step 305), and that original request did not indicate that a signal already was outstanding that would break a sleep at step 306 and such information had not been previously posted to the stub, then at this time the pseudo-signal is set, at step 308, and this information is posted to the stub, at step 309. The PSIGNAL() function is then exited.

The posting of the previous information to the stub process results in a pseudo-signal, node 205, on the stub which is used solely to break a breakable sleep in the manner to be discussed.

If the user process is in a breakable sleep at step 304, the sleep is broken at step 310, and the PSIGNAL() function is exited.

If no active stub exists at step 305, or if we have already posted to the active stub a signal that would break a breakable sleep at step 306, of if this signal is not one that would break the active stub's breakable sleep at step 307, the PSIGNAL() function is exited.

If the user process is not local at step 303, the signal is posted to the user process, at step 309 (see FIG. 8), and the PSIGNAL() function is then exited.

Figure 9:
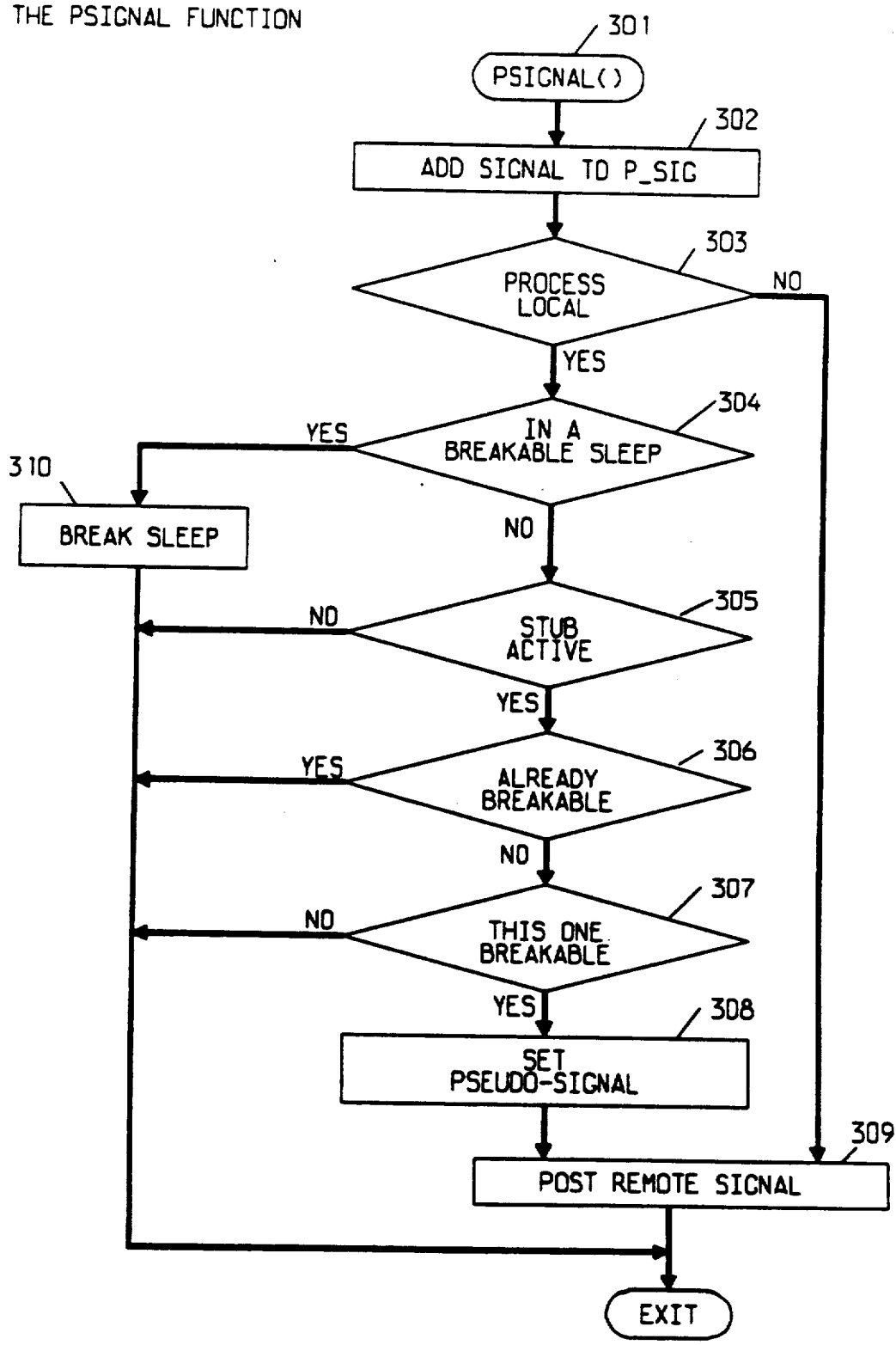
FIGS. 9 through 14 show flowcharts of the various functions performed by our system to control signal processing, wherein FIG. 9 flowcharts the PSIGNAL function.

In FIG. 9, at step 305, a stub is active if the SSACT flag is set in the p_flag word.

At step 306, the active stub has already been informed of a signal which would break a sleep if the SSISG flag is set in the p flag word.

At step 308, the SSISG flag is in fact the pseudo-signal.

At step 307, a signal having the potential to break a sleep is determined by examining the signal disposition as specified by the user process. This information is only maintained on the user processor.

Figure 10:
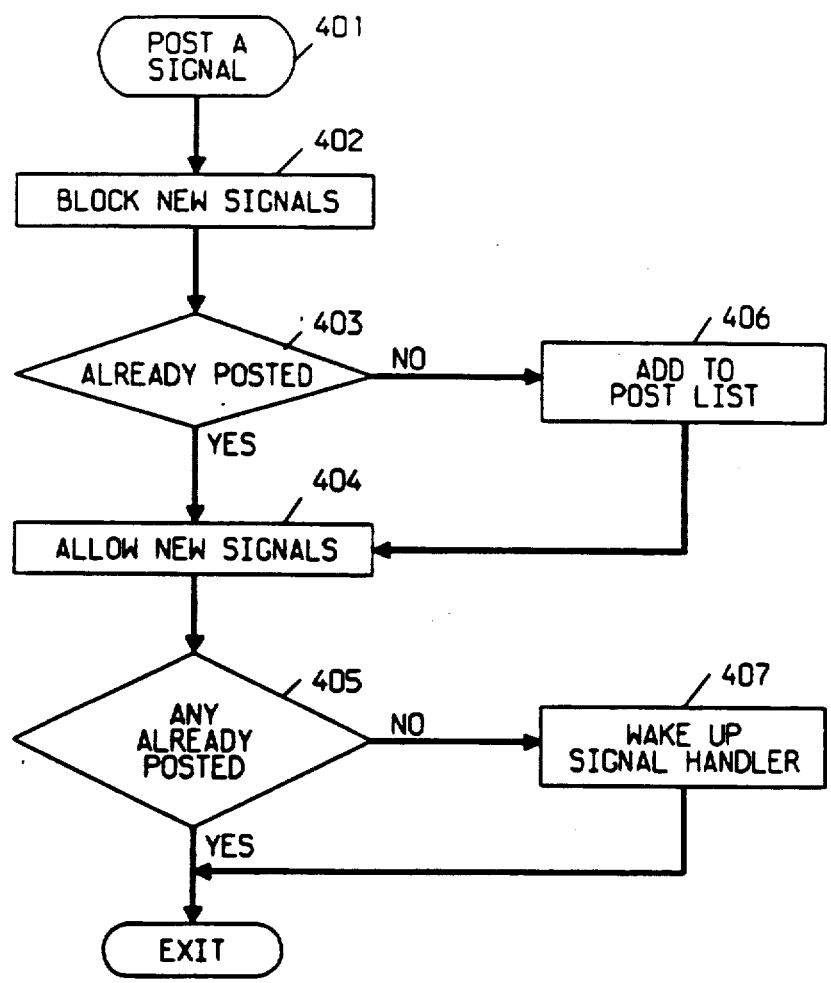
Figure 11:
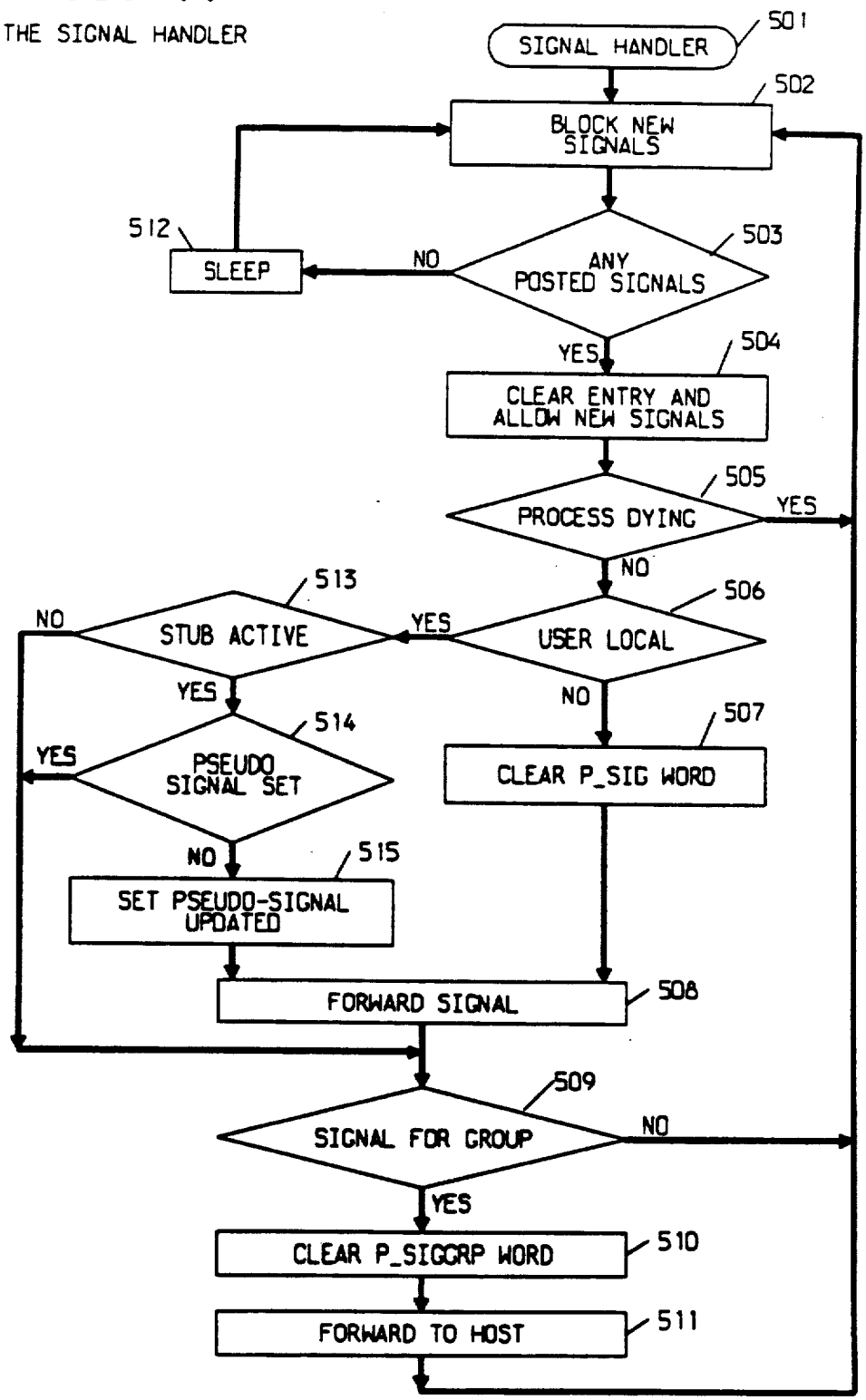

FIG. 10 shows the function of posting a signal. In response to a command to post a signal (e.g., step 309 of FIG. 9) received at step 401, the function blocks newly-generated signals, i.e., prevents the PSIGNAL function of FIG. 9 from being executed, at step 402. At step 403, "already posted" means the process is already on the linked post list of processes called the Siglink. This linked list identifies all processes which have signals associated with them that need to be routed elsewhere in the complex. If the process is not on the post list, it is added to the list, at step 406. If the process is on the post list at step 403, or once the process is added to the post list at step 406, new signals are allowed, i.e., execution of the PSIGNAL function of FIG. 9 is unblocked, at step 404. At step 405, "any already posted" means have any signals been posted, i.e., was there any process on the post list prior to steps 403 and 404. If not, the signal handler function of FIG. 11 is awakened, at step 407, to handle the posted signals. Following step 404 or 407, the function of FIG. 10 is exited.

FIG. 11 shows the signal handling function. Upon being initiated, at step 501, the function blocks newly-generated signals, at step 502, in the manner of step 401 of FIG. 10. At step 503, the function checks whether any signals have been posted, in the manner of step 405 of FIG. 4. If not, the function goes to sleep, at step 512, thereby unblocking new signals, until it is awakened again (e.g., step 407 of FIG. 10), at which point it returns to step 502.

If the signal handling function finds, at step 503, that signals have been posted, it clears an entry from the post list and unblocks newly-generated signals, at step 504. The clearing of the $p_{13}$ sig and p_siggrp words actually occur at "clear entry" step 504, in order to take place within the section of code, steps 502-504, which runs with new signals blocked. They, however, logically belong where they appear in this flowchart. The "clear entry" step 504 primarily means the process currently being examined is removed from the Siglink linked list. Subsequent arrival of new signals may attempt to put it back on this linked list, hence the necessary blockage at step 502 of new signals for a short period of time.

Next, the function checks at step 505 whether the process that formed the cleared entry of the post list is a dying process. If so, the function merely returns to step 502. If the process is not a dying process, the function checks whether the user process is local, at step 506. If not, the function clears the P_SIG word of the process that formed the cleared entry of the post list, at step 507, and forwards whatever signal is recorded in that P_SIG word to the user process, at step 508. If the user process is local, the function checks whether the process has an active stub process, at step 513. If there is an active stub process, the function checks whether the pseudo-signal (i.e., the SSISG flag indicating whether there is a signal for that stub) is set, at step 514. If the pseudo-signal is not set, a note is made of the fact that the pseudo-signal has been updated (i.e., SSSIG is set), at step 515, and the signal is forwarded to the active stub, at step 508.

Following step 508, or if there is no active stub at step 513, or if the pseudo-signal is set at step 514, the function checks whether the signal is for a group of processes, at step 509. If not, the function merely returns to step 502. If the signal is a group signal, at step 509, the function clears the P_SIGGRP word (see step 806 of FIG. 14), at step 510. The function then forwards the signal to the host processor, at step 511, and then returns to step 502.

The "forward to host" step 511 and "forward signal" step 508 imply packet communication over the bus 104, which is outside the scope of this discussion.

Figure 12:
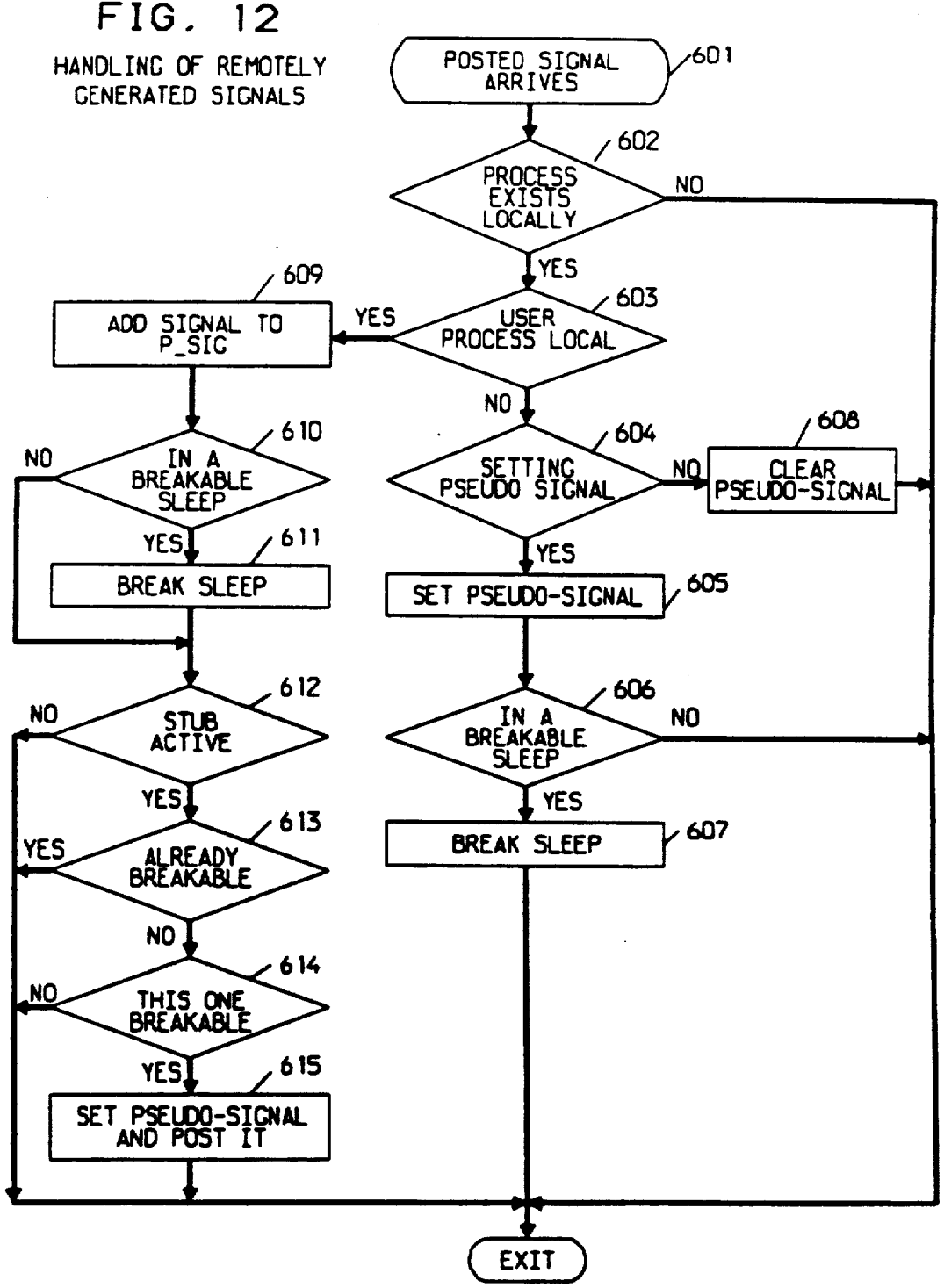

FIG. 12 represents the activity which occurs when a remotely posted signal arrives at a new processor. Note the similarity between this function and the psignal function of FIG. 9.

Figure 13:
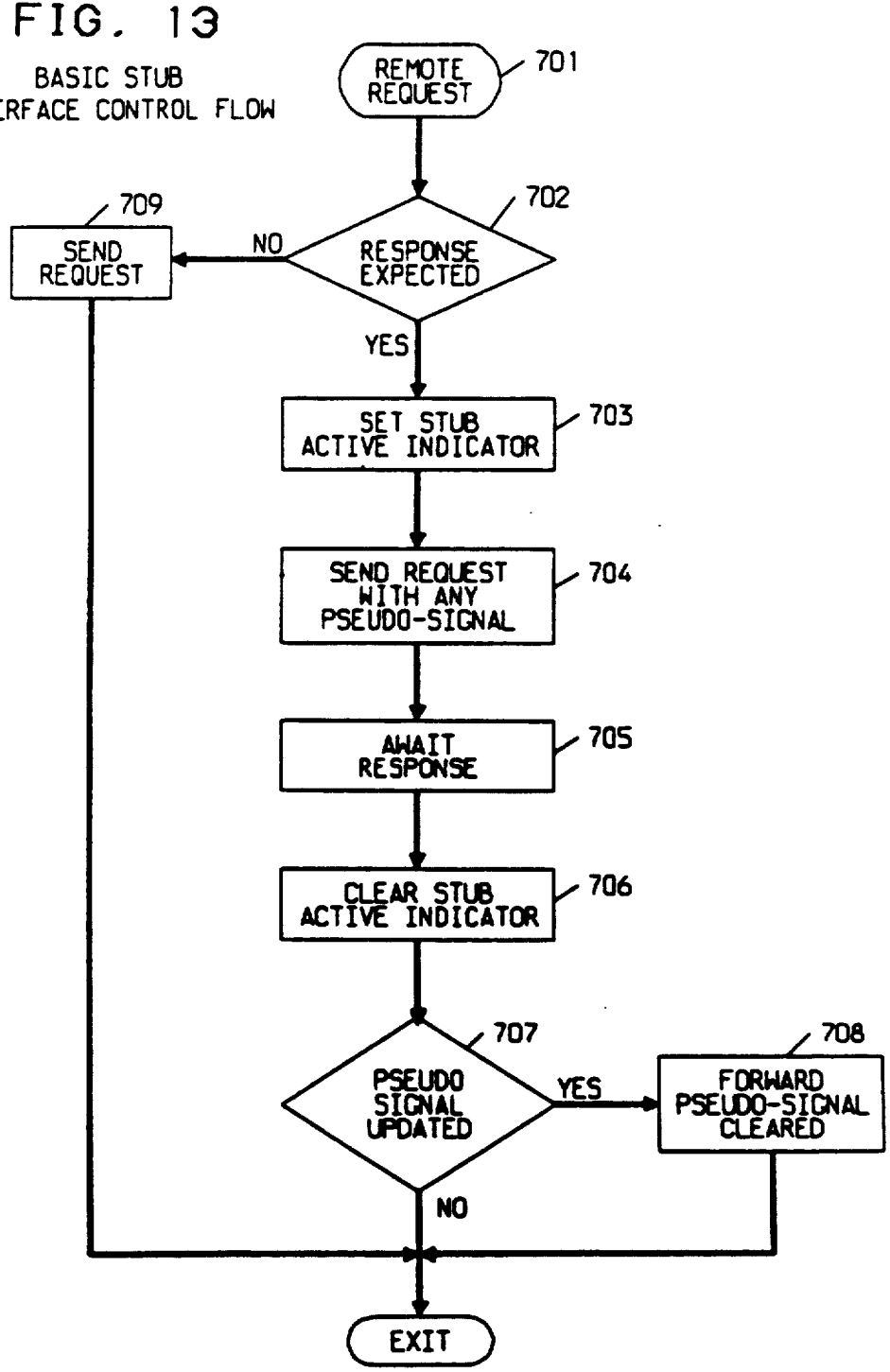

This function is activated by arrival of a signal posted to a process, e.g., from step 508 of FIG. 11 or step 708 of FIG. 13. The existence of any process may change locally before another is aware of it; hence, the first check performed here is to verify the process' existence, at step 602. If the process does not exist locally, the function is exited.

If the process does exist at step 602, a second check is made, of whether the user process is local, i.e., is the local process a user or a stub process, at step 603.

The second check is necessary because the function services both the arrival of true signals (to the user process) as well as pseudo-signals (both set and cleared) for stub processes. If the user process is local, the signal is added to the destination process' P-SIG word, at step 609 equivalent to step 302 of FIG. 9. A check is then made whether the user process is in a breakable sleep, at step 610 equivalent to step 310 of FIG. 9. If the process is in a breakable sleep, the sleep is broken, at step 611 equivalent to step 310 of FIG. 9. After the sleep is broken, or if the process is not in a breakable sleep at step 610, checks are performed at steps 612-614 equivalent to steps 305-307 of FIG. 9, and the pseudo-signal is set and 25 posted, at step 615 equivalent to steps 308-309 of FIG. 9. The function then exists.

Returning to step 603, if the local process is not the user process, a check is made to determine whether the signal is setting or clearing the process' pseudo-signal, at step 604, and the pseudo-signal is set or cleared accordingly, at steps 605 and 608, respectively. Following clearing of the pseudo-signal, the function exits. Following setting of the pseudo-signal, a check is made of whether the stub process is in a breakable sleep, at step 606. If not, the function exits. If the stub process is in a breakable sleep, the sleep is broken, at step 607 equivalent to step 611, and the function exits.

FIG. 13 shows the basic stub interface control flow, illustrating how a pseudo-signal is cleared at the end of a user request to a stub.

When the user process is making a request to the stub process, at step 701, a check is made of whether the user process expects a response to the request, at step 702. If not, the request is merely sent to the stub process, at step 709, and the function is then exited.

If no response is expected from a request to a stub, then there is no possibility that the stub can drop into a breakable sleep so such requests do not follow the active stub protocol used for signals.

If the user process does expect a response, the "stub active" indicator is set, at step 703.

Setting the stub active indicator (SSACT flag in the p_flag field) also implies setting the p_port field with information which will allow the later identification of an active stub's processor. This is required if a pseudo-signal needs to be forwarded. Then any pending pseudo-signal is sent to the stub along with the user request, at step 704. The user process is then suspended awaiting a response to its request from the stub process, at step 705.

When the request completes, causing a response to the user request to arrive from the stub process, the "stub active" indicator is cleared, at step 706, and a check is made if the pseudo-signal was ever updated, at step 707. If the pseudo-signal had been updated (as indicated by the SSSIG flag in the p_flag word) then a final clear pseudo-signal must be sent to the stub process (see step 601 of FIG. 12), at step 708. The function is then exited. If the pseudo-signal was not updated, it does not need clearing, and hence the function is merely exited.

Figure 14:
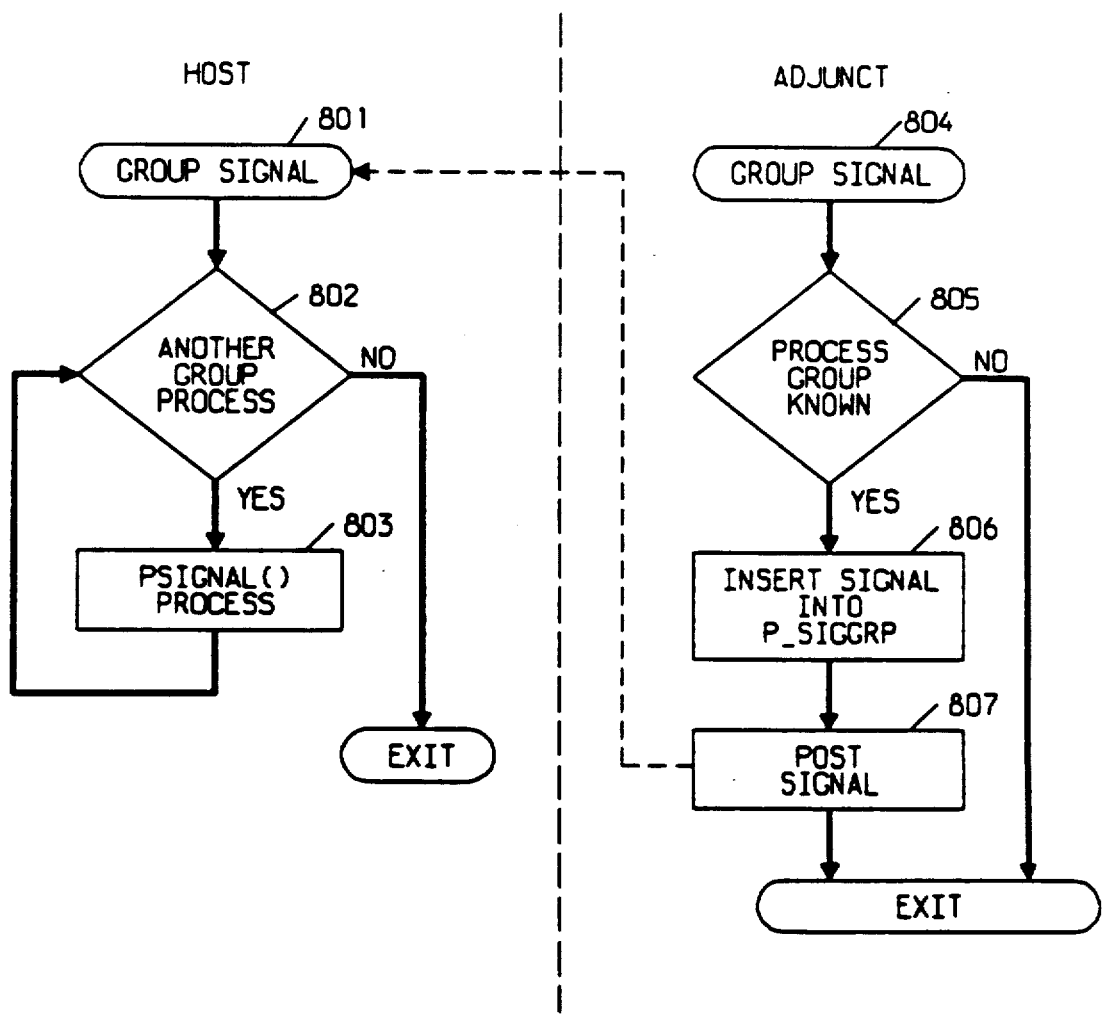

FIG. 14 illustrates the function for handling group signals. In response to arrival of a group signal on an adjunct processor, at step 804, a determination is made of whether the group of processes for which the signal is intended is known to the adjunct, at step 805. If not, the adjunct does not know how to handle that signal, and so the function is exited. If the process group is known, the signal is inserted into the process group's P_SIGGRP, at step 806. The adjunct processor then simply forwards the group signal to the host processor via the posting mechanism (see steps 509-511 of FIG. 11), at step 807. The function is then exited.

In response to arrival of a group signal on the host processor, at step 801 the entire list of active processes is searched at step 802 looking for those processes corresponding to a process group. Each such process receives the designated signal at step 803, via the PSIG- NAL() function of FIG. 9. When it is determined at step 802 that all signals for the given process group have been posted to the processes of that group, the function is exited.

What is claimed is:

1. A signal-handling arrangement for a multi-processor system that includes an extended process comprising a user process and a plurality of stub processes, each residing in a different processor of the multi-processor system, wherein each stub process of the extended process has an active and an inactive state with respect to the user process, and wherein signals are used to inform the processes of the extended process of asynchronous events occurring external to the extended process, the signal-handling arrangement comprising:

means in each processor other than the processor (first processor) on which the user process resides, responsive to receipt of a signal for the extended process, for posting the received signal from the receiving processor to the first processor without the receiving processor processing the received signal, to effect receipt of the posted signal on the first processor;

means in the first processor, responsive to receipt of a signal for the extended process, for applying the received signal to the user process on the first processor;

means in the first processor for determining whether the extended process is not ignoring any signal that are applied to the user process;

means responsive to a determination that any applied signals are not being ignored, for notifying of existence of the applied and non-ignored signals any processor (second processor) on which resides a stub process that is either active or being activated; and means in each second processor responsive to receipt of the notification, for either breaking or preventing a breakable sleep of the receiving second processor's resident stub process.

2. The arrangement of claim 1 further comprising:
   means in the first processor, responsive to a determination that any applied signals are not being ignored, for processing the applied and non-ignored signals.

3. The arrangement of claim 2 wherein
   the determining means comprise
   means for determining whether any signals that are presently applied to the user process are not being ignored by the extended process, and
   means for clearing the presently-applied signals; the arrangement further comprising
   means in the first processor, responsive to a determination that any presently-applied signals are not being ignored, for processing the presently-applied and non-ignored signals.

4. The arrangement of claim 1 wherein
   the notifying means comprise
   means for posting a pseudo-signal from the first processor to any second processor; and
   the breaking or preventing means comprise
   means in each second processor responsive to receipt of the posted pseudo-signal, for applying the pseudo-signal to the receiving second processor's resident stub process.

5. The arrangement of claim 1 wherein
   the notifying means comprise
   means for notifying of existence of the applied and non-ignored signals any processor on which resides a stub process that either (a) is being sent a user process' request to perform an action, or (b) has been sent a user process' request to which a response had not been received by the user process and to which a previous notification has not been sent.

6. The arrangement of claim 1 further comprising:
   means responsive to a determination that all applied signals are being ignored, for notifying any second processor of non-existence of applied and non-ignored signals; and
   means in each second processor responsive to receipt of the notification of non-existence of applied and non-ignored signals, for either continuing or permitting a breakable sleep of the second processor's resident stub process.

7. The arrangement of claim 1 wherein
   the means for posting the received signal are means for forwarding the received signal without modification thereof to the first processor without taking further signal-related action on the receiving processor.

8. The arrangement of claim 1 wherein an active stub process is one that is performing work on behalf of the user process.

9. A signal-handling arrangement for a multi-processor system that includes an extended process comprising a user process and a plurality of stub processes, each residing in a different processor of the multi-processor system, wherein signals are used to inform the processes of the extended process of asynchronous events occurring external to the extended process, the signal-handling arrangement comprising:

means in each processor other than the processor (first processor) on which the user process resides, responsive to receipt of a signal for the extended process, for posting the received signal from the receiving processor to the first processor without the receiving processor processing the received signal, to effect receipt of the posted signal on the first processor;

means in the first processor, responsive to receipt of a signal for the extended process, for applying the received signal to the user process on the first processor;

means in the first processor for determining whether the extended process is not ignoring any signals that are applied to the user process;

means responsive to a determination that any applied signals are not being ignored, for notifying of existence of the applied and non-ignored signals either (i) any processor (second processor) on which resides a stub process that is being sent a user process' request to perform an action, or (ii) any processor (third processor) on which resides a stub process that has been sent a user process' request to which a response had not been received by the user process and to which a previous notification has not been sent; and means in each second or third processor responsive to receipt of the notification, for either breaking or preventing a breakable sleep of the receiving processor's resident stub process.

10. The arrangement of claim 9 wherein the breaking or preventing means comprise means in each receiving second and third processor for indicating receipt of the notification of existence of the applied and non-ignored signals; the arrangement further comprising means responsive to a determination that all applied signals are being ignored, for notifying of non-existence of applied and non-ignored signals any second processor, and means in each second processor responsive to receipt of the notification of non-existence of applied and non-ignored signals, for either (i) continuing or permitting a breakable sleep of the resident stub process, if receipt of notification of existence of applied and non-ignored signals is not indicated by the indicating means on the receiving second processor, or (ii) ignoring the notification of non-existence of applied and non-ignored signals on the receiving second processor, if receipt of notification of existence of applied and non-ignored signals is indicated by the indicating means on the receiving second processor.

11. The arrangement of claim 10 further comprising:

means in each third processor for sending a response to a user process' request from the resident stub process to the first processor;

means in the first processor, responsive to receipt of the response to the request, for sending a directive to ignore any previously-received signal notification to the third processor on which resides the responding stub process prior to sending of any new user process' request to the responding stub process;

means in the third processor on which resides the responding stub process, responsive to receipt of the directive, for clearing the indicating means of the directive-receiving third processor of any indication of receipt of notification of existence of applied and non-ignored signals.

12. The arrangement of claim 11 wherein the directive-sending means comprise:

means responsive to receipt of the response to the request, for determining whether notification of existence of applied and non-ignored signals had been sent to the responding stub process after it had been sent the responded-to request; and means responsive to a determination that a post-request notification of existence of applied and non-ignored signals had been sent to the responding stub process, for sending the directive to the third processor on which resides the responding stub process prior to sending of any new user process' request to the responding stub process.

13. The arrangement of claim 9 wherein the means for posting the received signal are means for forwarding the received signal without modification thereof to the first processor without taking further signal-related action on the receiving processor.

14. A signal-handling arrangement for a multi-processor system that includes an extended process comprising a user process and a plurality of stub processes, each residing in a different processor of the multi-processor system, wherein each stub process of the extended process has an active and an inactive state with respect to the user process and wherein signals are used to inform the processes of the extended process of asynchronous events occurring external to the extended process, the signal-handling arrangement comprising:

means in each processor other than the processor (first processor) on which the user process resides, responsive to receipt of a signal for the extended process, for posting the received signal from the receiving processor to the first processor without the receiving processor processing the received signal, to effect receipt of the posted signal on the first processor;

means in the first processor, responsive to receipt of a signal for the extended process, for applying the received signal to the user process on the first processor;

means in the first processor for determining whether the extended process is not ignoring any signals that are applied to the user process;

means responsive to a determination that any applied signals are not being ignored, for notifying of existence of the applied and non-ignored signals any processor on which resides a stub process (first stub process) that is being activated;

means responsive to a determination that any applied signals are not being ignored, for determining whether any stub process (second stub process) is active and has not been notified of existence of any applied and non-ignored signals;

means responsive to a determination of existence of a second stub process, for notifying the processor on which resides the second stub process of the existence of the applied and non-ignored signals; and means in each processor on which resides a first or a second stub process, responsive to receipt of the notification, for either breaking or preventing a breakable sleep of the resident stub process.

15. The arrangement of claim 14 wherein the means for posting the received signal are means for forwarding the received signal without modification thereof to the first processor without taking further signal-related action on the receiving processor.

16. The arrangement of claim 14 wherein an active stub process is one that is performing work on behalf of the user process.

17. A signal-handling arrangement for a multi-processor system that includes an extended process comprising a user process and a plurality of stub processes, each residing in a different processor of the multi-processor system, wherein signals are used to inform the processes of the extended process of asynchronous events occurring external to the extended process, the signal-handling arrangement comprising:

means in each processor other than the processor (first processor) on which the user process resides, responsive to receipt of a signal for the extended process, for posting the received signal from the receiving processor to the first processor without the receiving processor processing the received signal, to effect receipt of the posted signal on the first processor;

means in the first processor, responsive to receipt of a signal for the extended process, for applying the received signal to the user process on the first processor;

means in the first processor for determining whether the extended process is not ignoring any signals that are applied to the user process;

means responsive to a determination that any applied signals are not being ignored, for posting a positive pseudo-signal from the first processor to any processor on which resides any stub process (first stub process) that is being sent a user process' request to perform an action;

means in the first processor, responsive to a determination that any applied signals are not being ignored, for determining whether any stub process (second stub process) both (i) has been sent a user process' request to which a response had not been received by the user process and (ii) has not had a positive pseudo-signal posted to the processor on which it resides;

means in the first processor responsive to a determination of existence of a second stub process, for posting a positive pseudo-signal to the processor on which the second stub process resides; and means in each processor on which resides a first or a second stub process, responsive to receipt of the posted pseudo-signal, for applying the received pseudo-signal to the resident stub process.

18. The arrangement of claim 17 further comprising means responsive to a determination that all applied signals are being ignored, for posting a negative pseudo-signal from the first processor to any processor on which resides any first stub process.

19. The arrangement of claim 17 wherein the means for posting the received signal are means for forwarding the received signal without modification thereof to the first processor without taking further signal-related action on the receiving processor.

20. A method of handling signals in a multi-processor system that includes an extended process comprising a user process and a plurality of stub processes, each residing in a different processor of the multi-processor system, wherein each stub process of the extended process has an active and an inactive state with respect to the user process, and wherein signals are used to inform the processes of the extended process of asynchronous events occurring external to the extended process, the signal-handling method comprising the steps of:

(a) in response to receipt of a signal for the extended process on a processor other than the processor (first processor) on which the user process resides, posting the received signal from the receiving processor to the first processor without the receiving processor processing the received signal, to effect receipt of the posted signal on the first processor;

(b) in response to receipt of a signal for the extended process on the first processor, applying the received signal to the user process on the first processor;

(c) determining on the first processor whether the extended process is not ignoring any signals that are applied to the user process;

(d) in response to a determination that any applied signals are not being ignored, notifying of existence of the applied and non-ignored signals any processor (second processor) on which resides a stub process that is either active or being activated; and (e) in response to receipt of the notification by a second processor, either breaking or preventing a breakable sleep of the resident stub process.

21. The method of claim 20 further comprising the step of:

(f) in response to a determination that any applied signals are not being ignored, processing the applied and non-ignored signals on the first processor.

22. The method of claim 20 wherein the step of determining comprises the steps of determining whether any signals that are presently applied to the user process are not being ignored by the extended process, and clearing the presently-applied signals; the method further comprising the step of in response to a determination that any presently-applied signals are not being ignored, processing the presently-applied and non-ignored signals on the first processor.

23. The method of claim 20 wherein the step of notifying comprises the step of posting a pseudo-signal from the first processor to any second processor;

and the step of either breaking or preventing a breakable sleep comprises the step of in response to receipt of the posted pseudo-signal by a second processor, applying the pseudo-signal to the resident stub process.

24. The method of claim 20 wherein the step of notifying comprises the step of notifying of existence of the applied and non-ignored signals any processor on which resides a stub process that either (a) is being sent a user process' request to perform an action, or (b) has been sent a user process' request to which a response has not been received by the user process and to which a previous notification has not been sent.

25. The method of claim 20 further comprising the steps of:

(f) in response to a determination that all applied signals are being ignored, notifying any second processor of non-existence of applied and non-ignored signals; and (g) in response to receipt of the notification of non-existence of applied and non-ignored signals by a second processor, either continuing or permitting a breakable sleep of the resident stub process.

26. The method of claim 20 wherein the step of posting the received signal is the step of forwarding the received signal without modification thereof to the first processor without taking further signal-related action on the receiving processor.

27. The method of claim 20 in a system wherein an active stub process is one that is performing work on behalf of the user process.

28. A method of handling signals in a multi-processor system that includes an extended process comprising a user process and a plurality of stub processes, each residing in a different processor of the multi-processor system, wherein signals are used to inform the processes of the extended process of asynchronous events occurring external to the extended process, the signal-handling method comprising the steps of:

(a) in response to receipt of a signal for the extended process on a processor other than the processor (first processor) on which the user process resides, posting the received signal from the receiving processor to the first processor without the receiving processor processing the received signal, to effect receipt of the posted signal on the first processor;

(b) in response to receipt of a signal for the extended process on the first processor, applying the received signal to the user process on the first processor;

(c) determining on the first processor whether the extended process is not ignoring any signals that are applied to the user process;

(d) in response to a determination that any applied signals are not being ignored, notifying of existence of the applied and non-ignored signals either (i) any processor (second processor) on which resides a stub process that is being sent a user process' request to perform an action, or (ii) any processor (third processor) on which resides a stub process that has been sent a user process' request to which a response had not been received by the user process and to which a previous notification has not been sent; and (e) in response to receipt of the notification by a second or a third processor, either breaking or preventing a breakable sleep of the resident stub process.

29. The method of claim 28 wherein the step of either breaking or preventing comprises the step of indicating on the receiving second or third processor receipt of the notification of existence of the applied and non-ignored signals, the method further comprising the steps of (f) in response to a determination that all applied signals are being ignored, notifying of non-existence of applied and non-ignored signals any second processor, and (g) in response to receipt of the notification of non-existence of applied and non-ignored signals by a second processor, either (i) continuing or permitting a breakable sleep of the resident stub process, if receipt of notification of existence of applied and non-ignored signals is not indicated on the receiving second processor, or (ii) ignoring the notification of non-existence of applied and non-ignored signals on the receiving second processor, if receipt of notification of existence of applied and non-ignored signals is indicated on the receiving second processor.

30. The method of claim 29 further comprising the steps of:

(h) sending a response to a user process' request from the stub process residing on a third processor to the first processor;

(j) in response to receiving the response to the request and prior to sending any new user process' request to the responding stub process, sending a directive to ignore any previously-received signal, from the processor to the third processor on which resides the responding stub process; and (k) in response to receiving the directive on the third processor on which resides the responding stub process, clearing any indication of receipt of notification of existence of applied and non-ignored signals on the directive-receiving third processor.

31. The method of claim 30 wherein the step of sending a directive comprises the steps of:

in response to receiving the response to the request, determining whether notification of existence of applied and non-ignored signals had been sent to the responding stub process after it had been sent the responded-to request; and in response to determining that a post-request notification of existence of applied and non-ignored signals had been sent to the responding stub process, and prior to sending any new user process' request to the responding stub process, sending the directive to the third processor on which resides the responding stub process.

32. The method of claim 28 wherein the step of posting the received signal is the step of forwarding the received signal without modification thereof to the first processor without taking further signal related action on the receiving processor.

33. A method of handling signals in a multi-processor system that includes an extended process comprising a user process and a plurality of stub processes, each residing in a different processor of the multi-processor system, wherein each stub process of the extended process has an active and an inactive state with respect to the user process and wherein signals are used to inform the processes to the extended process of asynchronous events occurring external to the extended process, the signal-handling method comprising the steps of:

(a) in response to receipt of a signal for the extended process on a processor other than the processor (first processor) on which the user process resides, posting the received signal from the receiving processor to the first processor without the receiving processor processing the received signal, to effect receipt of the posted signal on the first processor.

(b) in response to receipt of a signal for the extended process on the first processor, applying the received signal to the user process on the first processor;

(c) determining on the first processor whether the extended process is not ignoring any signals that are applied to the user process;

(d) in response to a determination that any applied signals are not being ignored, notifying of existence of the applied and non-ignored signals any processor on which resides a stub process (first stub process) that is being activated;

(e) in response to a determination that any applied signals are not being ignored, determining whether any stub process (second stub process) is active and has not been notified of existence of any applied and non-ignored signals;

(f) in response to a determination of existence of a second stub process, notifying the processor on which resides the second stub process of the existence of the applied and non-ignored signals; and (g) in response to receipt of the notification by a processor on which resides a first or a second stub process, either breaking or preventing a breakable sleep of the resident stub process.

34. The method of claim 33 wherein the step of posting the received signal is the step of forwarding the received signal without modification thereof to the first processor without taking further signal-related action on the receiving processor.

35. The method of claim 33 in a system wherein an active stub process is one that is performing work on behalf of the user process.

36. A method of handling signals in a multi-processor system that includes an extended process comprising a user process and a plurality of stub processes, each residing in a different processor of the multi-processor system, wherein signals are used to inform the processes of the extended process of asynchronous events occurring external to the extended process, the signal-handling method comprising the steps of:

(a) in response to receipt of a signal for the extended process on a processor other than the processor (first processor) on which the user process resides posting the received signal from the receiving processor to the first processor without the receiving processor processing the received signal, to effect receipt of the posted signal on the first processor;

(b) in response to receipt of a signal for the extended process on the first processor, applying the received signal to the user process on the first processor;

(c) determining on the first processor whether the extended process is not ignoring any signals that are applied to the user process;

(d) in response to a determination that any applied signals are not being ignored, posting a positive pseudo-signal from the first processor to any processor on which resides any stub process (first stub process) that is being sent a user process' request to perform an action;

(e) in response to a determination that any applied signals are not being ignored, determining whether any stub process (second stub process) both (i) has been sent a user process' request to which a response had not bene received by the user process and (i) has not had a positive pseudo-signal posted to the processor on which it resides;

(f) in response to a determination of existence of a second stub process, posting a positive pseudo-signal from the first processor to the processor on which the second stub process resides; and (g) in response to receipt of the posted pseudo-signal by a processor on which resides a first or a second stub process, applying the received pseudo-signal to the resident stub process.

37. The method of claim 36 comprising the further step of:

(h) in response to a determination that all applied signals are being ignored, posting a negative pseudo-signal from the first processor to any processor on which resides any first stub process.

38. The method of claim 36 wherein the step of posting the received signal is the step of forwarding the received signal without modification thereof to the first processor without taking further signal-related action on the receiving processor.

* * * * *

UNITED STATES PATENT AND TRADEMARK OFFICE
CERTIFICATE OF CORRECTION

PATENT NO. : 5,062,040

DATED : October 29, 1991

INVENTOR(S) : Thomas P. Bishop; Robert W. Fish; James S. Peterson

It is certified that error appears in the above-identified patent and that said Letters Patent is hereby corrected as shown below:

Column 23, line 29, "signal" should read --signals--. Column 29, line 50, insert --first-- before the first occurrence of "processor". Column 30, line 16, "to" should read --of--. Column 30, line 25, delete the period and insert a semicolon. Column 31, line 3, insert a comma after "resides".

Signed and Sealed this

Twenty-first Day of June, 1994

Attest:

BRUCE LEHMAN

Attesting Officer    Commissioner of Patents and Trademarks